(12) United States Patent
Gollakota et al.

(10) Patent No.: US 9,971,414 B2
(45) Date of Patent: May 15, 2018

(54) DEVICES, SYSTEMS, AND METHODS FOR DETECTING GESTURES USING WIRELESS COMMUNICATION SIGNALS

(71) Applicant: University of Washington Through Its Center For Commercialization, Seattle, WA (US)

(72) Inventors: Shyamnath Gollakota, Seattle, WA (US); Shwetak N. Patel, Seattle, WA (US); Qifan Pu, Seattle, WA (US); Sidhant Gupta, Seattle, WA (US)

(73) Assignee: University of Washington Through Its Center For Commercialization, Seattle, WA (US)

( * ) Notice: Subject to any disclaimer, the term of this patent is extended or adjusted under 35 U.S.C. 154(b) by 0 days. days.

(21) Appl. No.: 14/779,946

(22) PCT Filed: Apr. 1, 2014

(86) PCT No.: PCT/US2014/032468
§ 371 (c)(1),
(2) Date: Sep. 24, 2015

(87) PCT Pub. No.: WO2014/165476
PCT Pub. Date: Oct. 9, 2014

(65) Prior Publication Data
US 2016/0054804 A1 Feb. 25, 2016

Related U.S. Application Data

(60) Provisional application No. 61/807,197, filed on Apr. 1, 2013, provisional application No. 61/925,105, filed on Jan. 8, 2014.

(51) Int. Cl.
*G06F 13/28* (2006.01)
*G06F 3/01* (2006.01)

(52) U.S. Cl.
CPC .............. *G06F 3/017* (2013.01); *G06F 13/28* (2013.01)

(58) Field of Classification Search
CPC ........ G06F 13/28; G06F 3/017; G06F 3/1454; G06F 3/012; G06F 3/013; G09G 2370/16;
(Continued)

(56) References Cited

U.S. PATENT DOCUMENTS 6,127,974 A 10/2000 Kesler
7,030,860 B1 4/2006 Hsu et al.
(Continued)

FOREIGN PATENT DOCUMENTS

CN 103308934 A 9/2013
WO 2011146517 A2 11/2011
(Continued)

OTHER PUBLICATIONS

S. Gerasenko, A. Joshi, S. Rayaprolu, K. Ponnavaikko and D. P. Agrawal, "Beacon signals: what, why, how, and where?," IEEE, in Computer, vol. 34, No. 10, pp. 108-110, Oct. 2001.*
(Continued)

*Primary Examiner* — Olga Merkoulova
*Assistant Examiner* — Jarurat Suteerawongsa
(74) *Attorney, Agent, or Firm* — Dorsey & Whitney LLP

(57) ABSTRACT

Examples of systems, devices, and methods are described herein that can provide for gesture recognition. Wireless communication signals are received from sources in an environment (e.g. cellular telephones, computers, etc.). Features of the wireless communication signals (e.g. Doppler shifts) are extracted and utilized to identify gestures. The use of wireless communication signals accordingly make possible gesture recognition in a whole-home environment that identifies gestures performed through walls or other obstacles.

25 Claims, 9 Drawing Sheets

(58) Field of Classification Search
CPC .......... G02B 27/0101; G02B 2027/013; G02B 2027/0138; G02B 2027/0147
See application file for complete search history.

(56) References Cited

U.S. PATENT DOCUMENTS

| | | | |
|---|---|---|---|
| 7,078,911 | B2 | 7/2006 | Cehelnik |
| 7,345,618 | B1 | 3/2008 | Cole et al. |
| 8,064,704 | B2 | 11/2011 | Kim et al. |
| 8,279,119 | B2 | 10/2012 | Elwell, Jr. et al. |
| 8,344,949 | B2 | 1/2013 | Moshfeghi |
| 8,362,942 | B2 | 1/2013 | McNeill et al. |
| 8,576,110 | B2 | 11/2013 | Valentine |
| 9,141,150 | B1* | 9/2015 | Trundle ................ G06F 1/1694 |
| 2004/0068409 | A1 | 4/2004 | Tanaka et al. |
| 2006/0197753 | A1 | 9/2006 | Hotelling |
| 2007/0121097 | A1 | 5/2007 | Boillot |
| 2007/0130547 | A1 | 6/2007 | Boillot |
| 2008/0230598 | A1 | 9/2008 | Bodin |
| 2008/0294656 | A1* | 11/2008 | Bhat ................. G06F 17/30985 |
| 2009/0034636 | A1 | 2/2009 | Kotecha et al. |
| 2010/0127967 | A1 | 5/2010 | Graumann et al. |
| 2010/0204953 | A1 | 8/2010 | Onishi et al. |
| 2010/0245091 | A1 | 9/2010 | Singh et al. |
| 2010/0271263 | A1* | 10/2010 | Moshfeghi ............ G01S 5/0263 342/378 |
| 2011/0134112 | A1 | 6/2011 | Koh et al. |
| 2011/0154266 | A1 | 6/2011 | Friend et al. |
| 2011/0181509 | A1 | 7/2011 | Rautiainen et al. |
| 2011/0181510 | A1* | 7/2011 | Hakala .................... G06F 3/017 345/158 |
| 2011/0230178 | A1 | 9/2011 | Jones et al. |
| 2011/0310005 | A1 | 12/2011 | Chen et al. |
| 2012/0001875 | A1 | 1/2012 | Li et al. |
| 2012/0146796 | A1 | 6/2012 | Margon et al. |
| 2012/0280900 | A1 | 11/2012 | Wang et al. |
| 2012/0319959 | A1 | 12/2012 | Saponas et al. |
| 2013/0149964 | A1 | 6/2013 | Kreiner |
| 2013/0162513 | A1 | 6/2013 | Ronkainen |
| 2013/0184002 | A1 | 7/2013 | Moshfeghi |
| 2013/0309964 | A1 | 11/2013 | Hall et al. |
| 2014/0204511 | A1 | 7/2014 | Oh et al. |
| 2014/0232644 | A1 | 8/2014 | Aaron |
| 2014/0267068 | A1* | 9/2014 | Smith .................. H03K 17/962 345/173 |
| 2016/0259421 | A1 | 9/2016 | Gollakota et al. |
| 2017/0131395 | A1 | 5/2017 | Reynolds et al. |

FOREIGN PATENT DOCUMENTS

| | | |
|---|---|---|
| WO | 2012143603 A2 | 10/2012 |
| WO | 2012152476 A1 | 11/2012 |
| WO | 2014019068 A1 | 2/2014 |
| WO | 2014165476 A1 | 10/2014 |
| WO | 2015054419 A1 | 4/2015 |
| WO | 2015200710 A2 | 12/2015 |

OTHER PUBLICATIONS

International Search Report and Written Opinion dated Sep. 11, 2015 received for PCT/US2015/037813, 8 pgs.
Ketabdar, H. et al., "MagiMusic: Using Embedded Compass (Magnetic} Sensor for Touch-less Gesture Based Interaction with Digital Music Instruments in Mobile Devices", ACM. [online], Jan. 2011. [Retrieved Aug. 16, 2015] Retrieved from http://www.researchgate.net/profile/Amin_Haji-Abolhassani/publication/221308679_MagiMusic_using_embedded_compass_(magnetic}_sensor_for_touch-less_gesture_based_interaction_with_d, 241-244.
Zhao, Chen et al., "SideSwipe: Detecting In-air Gestures Around Mobile Devices Using Actual GSM Signals", Electrical Engineering, Computer Science & Engineering, UbiComp Lab, DUB Group University of Washington. Retrieved from <URL:http://www.keyuc.comiresearch/SideSwipe/SideSwipe_UIST2014.pdf> Fig 1-9, p. 1.
International Search Report and Written Opinion for PCT/US14/32468 dated Aug. 28, 2014.
International Search Report and Written Opinion for PCT/US14/59750 dated Jan. 13, 2015.
Kellogg, Bryce et al., "Bring Gesture Recognition to All Devices", Usenix NSDI. vol. 14. 2014, Apr. 2014.
Melgarejo, Pedro et al., "Leveraging Directional Antenna Capabilities for Fine-grained Gesture Recognition", Proceedings of the 2014 ACM International Joint Conference on Pervasive and Ubiquitous Computing. ACM, Sep. 2014, http://dl.acm.org/citation.cfm?id—2632095.
Nadakumar, Rajalakshmi et al., "Wi-Fi Gesture Recognition on Existing Devices", arXiv preprint arXiv:1411.5394 (2014), Nov. 2014.
Sigg, Stephan et al., "Leveraging RF-Channel Fluctuation for Activity Recognition: Active and Passive Systems, Continuous and RSSI-based Signal Features", Proceedings of International Conference on Advances in Mobile Computing & Multimedia, ACM, Dec. 2013. http://dl.acm.org/citation.cfm?id=2536873.
Sigg, Stephan et al., "Passive, Device-free Recognition on your Mobile Phone: Tools, Features and A Case Study", Mobile and Ubiquitous Systems: Computing, Networking, and Services. Springer International Publishing, Sep. 28, 2014, 435-445. http://www.teco.kit.edu/~michael/publication/Mobiquitous2013.pdf/.
Sigg, Stephan et al., "The Telepathic Phone: Frictionless Activity Recognition from Wifi-rssi", 2014 IEEE International Conference on Pervasive Computing and Communications (PerCom), Mar. 2014, http://ieeexplore.ieee.org/xpls/abs_all.jsp?arnumber=6813955.
1Techportal, Maximize your Galaxy S4's Battery in Five Ways, available online at: http://www.1techportal.com/2013/05/maximize-your-galaxy-s4s-battery-in-five-ways/, 2 pages. (May 2013).
Acquitek Inc, Fury GPS Disciplined Frequency Standard, available online at: https://www.acquitek.com/document.php, 2 pages (Sep. 2016).
Adib, et al., 3D Tracking via Body Radio Reflections, Proceedings of the 11th USENIX Conference on Networked Systems Design and Implementation, pp. 317-329 (Apr. 2014).
Adib, et al., See Through Walls with WiFi! Proceedings of the ACM SIGCOMM 2013 Conference on SIGCOMM (SIGCOMM '13), ACM SIGCOMM Computer Communication Review, 43(4), pp. 75-86 (Aug. 2013).
Advantaca, About Advantaca, available online at: http://www.advantaca.com/AboutAdvantaca.htm, 1 page (Aug. 2007).
Ashbrook, et al., Nenya: Subtle and Eyes-Free Mobile Input with a Magnetically-Tracked Finger Ring, Proceedings of the SIGCHI Conference on Human Factors in Computing Systems (CHI '11), pp. 2043-2046 (May 2011).
Barnett, et al., A Passive UHF RFID Transponder for EPC Gen 2 with -14dBm Sensitivity in 0.13 μm CMOS, IEEE 2007 International Solid-State Circuits Conference (ISSCC 2007), Digest of Technical Papers, pp. 582-623 (Feb. 2007).
Bharadia, et al., Full Duplex Backscatter, Proceedings of the 12th ACM Workshop on Hot Topics in Networks (HotNets-XII), Article No. 4,7 pages (Nov. 2013).
Block, Toshiba Qosmio G55 features SpursEngine, Visual Gesture Controls, available online at: https://www.engadget.com/2008/06/14/toshiba-qosmio-g55-features-spursengine-visual-gesture-controls/, 3 pages (Jun. 2008).
Butler, et al., SideSight: Multi-'Touch' Interaction Around Small Devices, Proceedings of the 21st Annual ACM Symposium on User Interface Software and Technology (UIST '08), pp. 201-204 (Oct. 2008).
Charvat, et al., A Through-Dielectric Radar Imaging System, IEEE Transactions on Antennas and Propagation, 58(8), pp. 2594-2603 (Aug. 2010).
Chen, et al., Micro-Doppler Effect in Radar: Phenomenon, Model, and Simulation Study, IEEE Transactions on Aerospace and Electronic Systems, 42(1), pp. 2-21 (Jan. 2006).

(56) References Cited

OTHER PUBLICATIONS

Chen, et al., uTrack: 3D Input Using Two Magnetic Sensors, Proceedings of the 26th Annual ACM Symposium on User Interface Software and Technology (UIST '13), pp. 237-244 (Oct. 2013).
Chetty, et al., Target Detection in High Clutter Using Passive Bistatic WiFi Radar, 2009 IEEE Radar Conference, pp. 1-5 (May 2009).
Chetty, et al., Through-the-Wall Sensing of Personnel Using Passive Bistatic WiFi Radar at Standoff Distances, IEEE Transactions on Geoscience and Remote Sensing, 50(4), pp. 1218-1226 (Apr. 2012).
Chintalapudi, et al., "Indoor Localization without the Pain, Proceedings of the 16th Annual International Conference on Mobile Computing and Networking (MobiCom '10), pp. 173-184 (Sep. 2010)".
Choi, et al., "Achieving Single Channel, Full Duplex Wireless Communication, Proceedings of the 16th Annual International Conference on Mobile Computing and Networking (MobiCom '10), pp. 1-12 (Sep. 2010)".
Cohn, et al., "An Ultra-Low-Power Human Body Motion Sensor Using Static Electric Field Sensing, Proceedings of the 2012 ACM Conference on Ubiquitous Computing (UbiComp '12), pp. 99-102 (Sep. 2012)".
Cohn, et al., "Humantenna: Using the Body as an Antenna for Real-Time Whole-Body Interaction," Proceedings of the SIGCHI Conference on Human Factors in Computing Systems (CHI '12), pp. 1901-1910 (May 2012).
Cohn, et al., "SNUPI: Sensor Nodes Utilizing Powerline Infrastructure, Proceedings of the 12th ACM international conference on Ubiquitous computing (UbiComp '10), pp. 159-168 (Sep. 2010)".
Cohn, et al., "Your Noise is My Command: Sensing Gestures Using the Body as an Antenna, Proceedings of the SIGCHI Conference on Human Factors in Computing Systems, pp. 791-800 (May 2011)".
Crunchfish, "Redefining Mobile Interaction, available online at: http://crunchfish.com/, 6 pages (accessed Sep. 2016)".
Cyanogenmod, "Welcome to CyanogenMod, available online at: http://www.cyanogenmod.org/, 1 page (accessed Sep. 2016)".
Czeskis, et al., "RFIDs and Secret Handshakes: Defending Against Ghost-and-Leech Attacks and Unauthorized Reads with Context-Aware Communications, Proceedings of the 15th ACM Conference on Computer and Communications Security (CCS '08), pp. 479-490 (Oct. 2008)".
Dutta, et al., "Integrating Micropower Radar and Motes, available online at: https://people.eecs.berkeley.edu/~prabal/pubs/papers/OSU-CISRC-1203-TR67.pdf, 8 pages (2004; accessed Sep. 2016)".
Dutta, et al., "Towards Radar-Enabled Sensor Networks, In Fifth International Conference on Information Processing in Sensor Networks (IPSN 2006), pp. 467-474 (Apr. 2006)".
Ettus Research, "USRP™ N200/N210 Networked Series, available online at: https://www.ettus.com/content/files/07495_Ettus_N200-210_DS_Flyer_HR.pdf, 2 pages (Aug. 2013)".
Fisher, "Sweet Moves: Gestures and Motion-Based Controls on the Galaxy S III, available online at: http://pocketnow.com/2012/06/28/sweet-moves-gestures-and-motion-based-controls-on-the-galaxy-s-iii, 8 pages (Jun. 2012)".
Gollakota, et al., "Clearing the RF Smog: Making 802.11 Robust to Cross-Rechnology Interference, Proceedings of the ACM SIGCOMM 2011 Conference (SIGCOMM '11), ACM SIGCOMM Computer Communication Review, 41(4), pp. 170-181 (Aug. 2011)".
Gollakota, "International Search Report and Written Opinion dated Aug. 28, 2014 for PCT/US2014/032468 filed Apr. 1, 2014, 13 pages".
Gollakota, "International Search Report and Written Opinion dated Jan. 13, 2015 for PCT/US2014/059750 filed Oct. 8, 2014, 18 pages".
Gollakota, et al., "Zigzag Decoding: Combating Hidden Terminals in Wireless Networks, Proceedings of the ACM SIGCOMM 2008 Conference on Data Communication (SIGCOMM '08), ACM SIGCOMM Computer Communication Review, 38(4), pp. 159-170 (Aug. 2008)".

Gonzalez-Ruiz, et al., "An Integrated Framework for Obstacle Mapping with See-Through Capabilities Using Laser and Wireless Channel Measurements, IEEE Sensors Journal, 14(1), pp. 25-38 (Jan. 2014)".
Google Nexus S, "Nexus S, available online at: http://www.android.com/devices/detail/nexus-s, 2 pages (Mar. 2012)".
Gupta, et al., "SoundWave: Using the Doppler Effect to Sense Gestures, Proceedings of the SIGCHI Conference on Human Factors in Computing Systems (CHI '12), pp. 1911-1914 (May 2012)".
Halperin, et al., "Tool Release: Gathering 802.11n Traces with Channel State Information, ACM SIGCOMM Computer Communication Review, 41(1), pp. 53-53 (Jan. 2011)".
Harrison, et al., "Abracadabra: Wireless, High-Precision, and Unpowered Finger Input for Very Small Mobile Devices, Proceedings of the 22nd Annual ACM Symposium on User Interface Software and Technology (UIST '09), pp. 121-124 (Oct. 2009)".
Harrison, et al., "Scratch Input: Creating Large, Inexpensive, Unpowered and Mobile Finger Input Surfaces, Proceedings of the 21st Annual ACM Symposium on User Interface Software and Technology (UIST '08), pp. 205-208 (Oct. 2008)".
Harrison, et al., "Skinput: Appropriating the Body as an Input Surface, Proceedings of the SIGCHI Conference on Human Factors in Computing Systems (CHI '10), pp. 453-462 (Apr. 2010)".
Hedlerfog, "Hands-On Testing of Air Gestures on the Touchless Galaxy S4, available online at: http://touchlessgeneration.com/discover-touchless/testing-of-air-gestures-on-the-galaxy-s4/#.UkSVWIY3uSo, 4 pages (Apr. 2013)".
Intersil, "ISL28194 Data Sheet, available online at: http://www.intersil.com/content/dam/Intersil/documents/fn62/fn6236.pdf, 12 pages (Jan. 2014)".
Kellogg, et al., "Bringing Gesture Recognition to All Devices, Proceedings of the 11th USENIX Conference on Networked Systems Design and Implementation, pp. 303-316 (Apr. 2014)".
Ketabdar, et al., "MagiMusic: Using Embedded Compass (Magnetic) Sensor for Touch-Less Gesture Based Interaction with Digital Music Instruments in Mobile Devices, Proceedings of the 5th Int'l Conf. on Tangible, Embedded, and Embodied Interaction, pp. 241-244 (Jan. 2011)".
Kim, et al., "Digits: Freehand 3D Interactions Anywhere Using a Wrist-Worn Gloveless Sensor, Proceedings of the 25th Annual ACM Symposium on User Interface Software and Technology (UIST '12), pp. 167-176 (Oct. 2012)".
Kim, et al., "Human Activity Classification Based on Micro-Doppler Signatures Using a Support Vector Machine, IEEE Transactions on Geoscience and Remote Sensing, 47(5), pp. 1328-1337 (May 2009)".
Kriara, et al., "RFID Shakables: Pairing Radio-Frequency Identification Tags with the Help of Gesture Recognition, Proceedings of the 9th ACM Conference on Emerging Networking Experiments and Technologies (CoNEXT '13), pp. 327-332 (Dec. 2013)".
Leap Motion, "Available online at: https://www.leapmotion.com/, 6 pages (May 2013)".
Lin, et al., "Random Access Heterogeneous MIMO Networks, Proceedings of the ACM SIGCOMM 2011 Conference (SIGCOMM '11), ACM SIGCOMM Computer Communication Review, 41(4), pp. 146-157 (Aug. 2011)".
Liu, et al., "Ambient Backscatter: Wireless Communication Out of Thin Air, Proceedings of the ACM SIGCOMM 2013 Conference on SIGCOMM (SIGCOMM '13), ACM SIGCOMM Computer Communication Review, 43(4), pp. 39-50 (Aug. 2013)".
Melgarejo, et al., "Leveraging Directional Antenna Capabilities for Fine-Grained Gesture Recognition, Proceedings of the 2014 ACM International Joint Conference on Pervasive and Ubiquitous Computing (UbiComp '14), pp. 541-551 (Sep. 2014)".
Michalevsky, et al., "Backscatter Channel Characterization Using Geometric Models, available online at: http://web.stanford.edu/~kipnisal/EE359_Project/summary.pdf, 12 pages (Dec. 2013)".
Microchip, "MGC3130: Single-Zone 3D Tracking and Gesture Controller Product Brief, 6 pages (2012; accessed Sep. 2016)".
Microchip, "Microchip's MGC3130 is the world's first electrical near field (E-field) 3D Tracking and Gesture Controller, available online at: http://www.microchip.com/pagehandler/en-us/technology/gestic/home.html, 1 page (Mar. 2013)".

(56) References Cited

OTHER PUBLICATIONS

Nandakumar, et al., "Wi-Fi Gesture Recognition on Existing Devices, available online at: https://arxiv.org/pdf/1411.5394, 5 pages (2014; accessed Sep. 2016)".
Paradiso, et al., "The Magic Carpet: Physical Sensing for Immersive Environments, Extended Abstracts on Human Factors in Computing Systems (CHI EA '97), pp. 277-278 (Mar. 1997)".
Pointgrab, "Available online at: http://www.pointgrab.com/, 2 pages (Jan. 2014)".
primesense.com, "The PrimeSense™ 3D Awareness Sensor, available online at: http://www.primesense.com/wp-content/uploads/2012/12/PrimeSense-3D-Sensor-A4-Lo.pdf, 4 pages (Dec. 2013)".
Pu, et al., "Whole-Home Gesture Recognition Using Wireless Signals, Proceedings of the 19th Annual International Conference on Mobile Computing and Networking, pp. 27-38 (Sep. 2013)".
Ralston, et al., "Real-Time Through-Wall Imaging Using an Ultrawideband Multiple-Input Multiple-Output (MIMO) Phased Array Radar System, 2010 IEEE International Symposium on Phased Array Systems and Technology (Array), pp. 551-558 (Oct. 2010)".
Reynolds, "International Search Report and Written Opinion dated Sep. 11, 2015 for PCT/US2015/037813 filed Jun. 25, 2015, 8 pages".
Sample, et al., "Design of an RFID-Based Battery-Free Programmable Sensing Platform, IEEE Transactions on Instrumentation and Measurement, 57(11), pp. 2608-2615 (Nov. 2008)".
Sample, et al., "Experimental Results with Two Wireless Power Transfer Systems, Proceedings of the 4th International Conference on Radio and Wireless Symposium (RWS '09), pp. 16-18 (Jan. 2009)".
Santos, "Pioneer's Latest Raku Navi GPS Units Take Commands From Hand Gestures, available online at: https://www.engadget.com/2012/10/07/pioneer-raku-navi-gps-hand-gesture-controlled/, 3 pages (Oct. 2012)".
Saponas, et al., "PocketTouch: Through-Fabric Capacitive Touch Input, Proceedings of the 24th Annual ACM Symposium on User Interface Software and Technology (UIST '11), pp. 303-308 (Oct. 2011)".
Scholz, et al., "Challenges for Device-Free Radio-Based Activity Recognition, Proceedings of the 3rd Workshop on Context Systems Design, Evaluation and Optimization (CoSDEO 2007), in conjunction with MobiQuitous 2011, 12 pages (2011; retrieved Sep. 2016)".
Sen, et al., "Precise Indoor Localization Using PHY Layer Information, Proceedings of the 10th ACM Workshop on Hot Topics in Networks (HotNets-X), Article No. 18, pp. 1-6 (Nov. 2011)".
Sen, et al., "You are Facing the Mona Lisa: Spot Localization Using PHY Layer Information, Proceedings of the 10th International Conference on Mobile Systems, Applications, and Services (MobiSys '12), pp. 183-196 (Jun. 2012)".
Setlur, et al., "Target Localization with a Single Sensor via Multipath Exploitation, IEEE Transactions on Aerospace and Electronic Systems, 48(3), pp. 1996-2014 (Jul. 2012)".
Shotton, et al., "Real-Time Human Pose Recognition in Parts from Single Depth Images, 2011 IEEE Conference on Computer Vision and Pattern Recognition (CVPR), pp. 1297-1304 (Jun. 2011)".
Sigg, et al., "Leveraging RF-channel fluctuation for activity recognition: Active and passive systems, continuous and RSSI-based signal features, Proceedings of International Conference on Advances in Mobile Computing & Multimedia (MoMM '13), pp. 43-52 (Dec. 2013)".
Sigg, et al., "Passive, Device-Free Recog. on Your Mobile Phone: Tools, Features and a Case Study, Mobile and Ubiquitous Sys.: Computing, Networking, and Services, vol. 131 of the series Lect. Notes of Inst. Comp. Sci., Soc. Inf. and Tel. Eng'r, pp. 435-446 (Sep. 2014)".
Sigg, et al., "The Telepathic Phone: Frictionless Activity Recognition from WiFi-RSSI, 2014 IEEE International Conference on Pervasive Computing and Communications (PerCom 2014), pp. 148-155 (Mar. 2014)".
Silicon Labs, "AN580: Infrared Gesture Sensing, available online at: http://www.silabs.com/Support%20Documents/TechnicalDocs/AN580.pdf, 9 pages (Jan. 2015)".
smartthings.com, "Available online at: http://www.smartthings.com/, 5 pages (Jun. 2014)".
Starner, et al., "The Gesture Pendant: A Self-Illuminating, Wearable, Infrared Computer Vision System for Home Automation Control and Medical Monitoring, Proceedings of the 4th International Symposium on Wearable Computers (ISWC 2000), pp. 87-94 (Oct. 2000)".
STMICROELECTRONICS, "TS881 Datasheet—Production Data, available online at: www.st.com/resource/en/datasheet/ts881.pdf, 21 pages (Dec. 2013)".
Tan, et al., "Fine-Grained Channel Access in Wireless LAN, Proceedings of the ACM SIGCOMM 2010 Conference (SIGCOMM '10), ACM SIGCOMM Computer Communication Review, 40(4), pp. 147-158 (Aug. 2010)".
Texas Instruments, "MSP430F5310: MSP430F530x Mixed Signal Microcontroller, available online at: http://www.ti.com/product/msp430f5310, 4 pages (accessed Sep. 2016)".
Thalmic Labs, "Myo™ Gesture Control Armband, available online at: https://www.thalmic.com/en/myo/, 4 pages (Jun. 2014)".
Universal Serial Bus, "USB On-The-Go and Embedded Host, available online at: http://www.usb.org/developers/onthego/, 2 pages (Jul. 2014)".
Wigdor, et al., "LucidTouch: A See-Through Mobile Device, Proceedings of the 20th Annual ACM Symposium on User Interface Software and Technology (UIST '07), pp. 269-278 (Oct. 2007)".
Wilson, et al., "Radio Tomographic Imaging with Wireless Networks, IEEE Transactions on Mobile Computing, 9(5), pp. 621-632 (May 2010)".
Wilson, et al., "Through-Wall Motion Tracking Using Variance-Based Radio Tomography Networks, In ARXIV, available online at: http://arxiv.org/abs/0909.5417, 9 pages (Oct. 2009)".
XBOX, "Kinect, available online at: http://www.xbox.com/en-US/kinect, 3 pages (Jun. 2014)".
Xiong, et al., "ArrayTrack: A Fine-Grained Indoor Location System, Proceedings of the 10th USENIX Conference on Networked Systems Design and Implementation (NSDI '13), pp. 71-84 (Apr. 2013)".
Xiong, et al., "Towards Fine-Grained Radio-Based Indoor Location, Proceedings of the 12th Workshop on Mobile Computing Systems & Applications (HotMobile '12), Article No. 13, 6 pages (Feb. 2012)".
Youssef, et al., "Challenges: Device-Free Passive Localization for Wireless Environments, Proceedings of the 13th Annual ACM International Conference on Mobile Computing and Networking (MobiCom '07), pp. 222-229 (Sep. 2007)".
Zhao, et al., "Robust Estimators for Variance-Based Device-Free Localization and Tracking, In ARXIV, available online at: https://arxiv.org/abs/1110.1569, 23 pages (Sep. 2011)".
Zhao, et al., "SideSwipe: Detecting In-air Gestures Around Mobile Devices Using Actual GSM Signal, Proceedings of the 27th Annual ACM Symposium on User Interface Software and Technology, pp. 527-534 (Oct. 2014)".

\* cited by examiner

DEVICES, SYSTEMS, AND METHODS FOR DETECTING GESTURES USING WIRELESS COMMUNICATION SIGNALS

CROSS-REFERENCE TO RELATED APPLICATIONS

This application is a Section 371 national stage entry of PCT Application No. PCT/US2014/032468, filed Apr. 1, 2014, which further claims the benefit of the filing date of U.S. Provisional Application No. 61/807,197, filed Apr. 1, 2013 and U.S. Provisional Application No. 61/925,105, filed Jan. 8, 2014. These applications are incorporated by reference herein in their entirety and for all purposes.

TECHNICAL FIELD

Examples described herein relate to detection of environmental changes, such as gestures. Examples are described where wireless communication signals, such as Orthogonal Frequency-Division Multiplexing (OFDM) signals, may be utilized to detect environmental changes such as gestures.

BACKGROUND

As computing moves increasingly away from the desktop, there is a growing need for new ways to interact with computer interfaces. The Xbox Kinect is an example of a commercially available input sensor that enables gesture-based interaction using an image sensor, depth sensing and computer vision. Gestures enable a whole new set of interaction techniques for always-available computing embedded in the environment. For example, using a swipe hand motion in-air, a user could control the music volume while showering, or change the song playing on a music system installed in the living room while cooking, or turn up the thermostat while in bed.

However, the time and cost to deploy complex vision-based sensing devices may prohibit their adoption, and may make it impractical or impossible to deploy throughout an entire home or building.

Body-worn or attached sensors have been proposed to reduce the need for vision-based sensors. However, these approaches may be limited by what a user is willing to constantly wear or carry.

SUMMARY

This summary is provided by way of example, and is not intended to be limiting.

Examples of devices are described herein. An example device may include a receiver configured to receive wireless communication signals. The example device may include at least one processing unit configured to identify features in the wireless communication signals. The example device may include a memory accessible to the at least one processing unit and storing information regarding features in wireless communication signals caused by gestures. The at least one processing unit may be further configured to identify a gesture based on the identified features in the wireless communication signals.

In some examples, the wireless communication signals include OFDM signals. In some examples, the wireless communication signals include RSSI, phase information, or combinations thereof.

In some examples, the at least one processing unit is configured to identify features in the wireless communication signals at least in part by analyzing a Doppler shift in the wireless communication signals.

Examples of methods are described herein. An example method includes receiving wireless communication signals from devices in an environment, detecting features in the wireless communication signals, identifying a gesture based, at least in part, on the features in the wireless communication signals, and providing a control signal responsive to identification of the gesture.

In some examples, the wireless communication signals may be OFDM signals.

In some examples, detecting features in the wireless communication signals comprises identifying a Doppler shift in the wireless communication signals.

Examples of systems are described herein. An example system may include a wireless communications device configured to provide periodic beacon signals. In some examples the periodic beacon signals may be provided using an OFDM protocol. The system may include a router configured to receive the periodic beacon signals from the wireless communications device. The router may be in communication with a memory storing a plurality of gesture signatures. The router may be configured to detect a gesture based on a comparison of features in the periodic beacon signals from the wireless communications device and the gesture signatures. The router may further include a transmitter configured to transmit a control signal responsive to the gesture. The system may further include a controller coupled to a power outlet and including a receiver configured to receive the control signal. The controller may be configured to turn power on, off, or combinations thereof, responsive to the control signal.

DETAILED DESCRIPTION

Examples described herein include devices, methods, and systems that may identify environmental changes, such as gestures, by analyzing wireless communication signals. Accordingly, gestures may be recognized without the use of cameras or body-worn or carried devices. Examples described herein may utilize wireless communication signals (e.g. WiFi signals) to recognize gestures. Since wireless communication signals generally do not require line-of-sight and can traverse through walls, gestures may be detected utilizing the sources of wireless communications signals that may already be present in an environment (e.g. a WiFi AP and a few mobile devices in a living room).

Gestures may be recognized in accordance with examples described herein by analyzing features in wireless communications signals that occur in wireless communication signals due to gestures made in the environment. The features in wireless communication signals may include, but are not limited to, Doppler shifts, multi-path distortions, or combinations thereof.

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Figure 1:
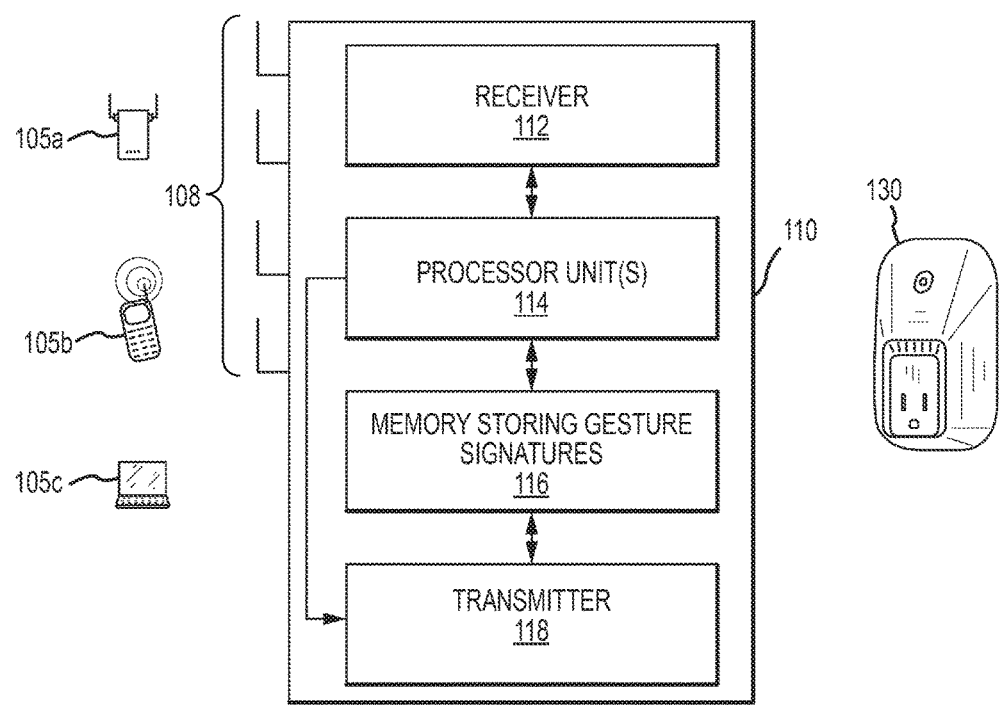
FIG. 1 is a schematic illustration of a system arranged in accordance with an embodiment of the present invention.

FIG. 1 is a schematic illustration of a system arranged in accordance with an embodiment of the present invention. The system 100 includes wireless communications devices 105a, 105b, and 105c in an environment. The system 100 further includes a device 110. The device 110 may include one or more antennas 108, a receiver 112, one or more processing unit(s) 114, a memory storing gesture signatures 116, and a transmitter 118. The system 100 further includes a controller 130 which may be coupled, for example, to a power outlet.

The wireless communications devices 105a-c may be implemented using any of a variety of devices including, but not limited to, routers, cellular telephones, laptops, desktops, or gaming systems. Although three are shown in FIG. 1 any number may be used. The wireless communications devices may generally include any devices configured to transmit wireless communications signals. The wireless communications devices usable with the system 100 may generally be located in a variety of positions within an environment. For example, the devices 105a-c may be located at different positions in a room of a house or other structure. The devices 105a-c may be located in different rooms of a house or other structure. The wireless communications signals provided by the devices 105a-c may generally penetrate walls or other barriers within an environment, and accordingly may be distributed throughout the environment. Wireless communications signals may include received signal strength indicators (RSSI), phase information, or combinations thereof.

Wireless communications signals usable herein including, but are not limited to, WiFi signals, WiMAX signals, LTE signals, or combinations thereof. The wireless communications signals may be OFDM signals, signals utilizing other communications encoding schemes, other wireless signals, or combinations thereof. Generally, any wireless signals may be used, and may facilitate gesture recognition in non-line-of-sight and through-the-wall scenarios. OFDM is generally used to implement wireless systems including 802.11a/g/n, WiMAX, and LTE. In some examples the wireless communications signals may include beacon signals which may, for example, be transmitted periodically by one or more of the devices 105a-c.

The device 110 may include one or more antennas 108 that may receive wireless communications signals transmitted by the devices 105a-c. The device 110 may be implemented using a router, laptop, desktop, other computing system, cellular telephone, or other device. The device 110 includes a receiver 112. The receiver 112 may receive the wireless communications signals. The device 110 may further include one or more processing unit(s) 114. The processing unit(s) 114 may identify features in the wireless communications signals received by the receiver 112 which features may be indicative of changes in the environment, such as gestures made by one or more entities in the environment. The processing unit(s) 114 may identify features in the wireless communication signals, for example, by analyzing a Doppler shift in the wireless communication signals, multi-path distortions in the wireless communication signals, or combinations thereof.

Devices in accordance with embodiments of the present invention may generally identify gestures made by any entities in an environment. Entities may include, but are not limited to, humans (including adults and children), animals (e.g. pets), or any other item that may make gestures in an environment (e.g. robots or other machinery). Examples of devices described herein may further be able to distinguish gestures made by a particular entity from gestures made by other entities.

The processing unit(s) may be implemented using, for example, one or more processors. In other examples, the processing unit(s) may be implemented using circuitry for performing the described functions, which may include, for example, transform circuitry. In some examples, the device 110 may be programmed, e.g. using computer executable instructions encoded on one or more memories accessible to the processing unit(s) 114. The computer executable instructions may include instructions for performing the functions of the processing unit(s) described herein.

The device 110 may further include a memory 116 storing gesture signatures. The memory 116 may be implemented using any variety of memory including, but not limited to solid state memory, flash memory, disk drives, system memory, or combinations thereof. The memory 116 may store gesture signatures. Gesture signatures generally refer to data representative of features in wireless communications signals corresponding to particular gestures. The memory 116 may be in communication with the processing unit(s) 114. In some examples, the memory 116 may be included in the device 110. In other examples, the memory 116 may be separate from the device 110. The memory 116 may be in communication with the processing unit(s) 114, for example either by being connected to the processing unit(s) or by being in wireless or other communication with the processing unit(s).

The processing unit(s) 114 may compare the identified features in the communications signals with the gesture signatures stored in the memory 116. In this manner the processing unit(s) 114 may identify that one or more gestures occurred in the environment. Responsive to identifying one or more gestures occurring in the environment, the device may take some action.

For example, the device 110 may include a transmitter 118 which may transmit a control signal responsive to identification of a particular gesture. The control signal may be indicative of a gesture, or a combination of gestures, that were identified by the device 110. The control signal may be provided to any number of other devices to take action based on the performed gestures.

For example, the system 100 includes a controller 130 that may be plugged into an outlet. The controller 130 may receive the control signal generated by the device 110 and may, for example, toggle power to one or more devices coupled to the controller 130. In this manner, a light coupled to the controller 130 may be turned on and/or off by performance of a gesture. The gesture may be identified by the device 110 and a control signal sent to the controller 130 to turn off or on power to the light.

Figure 9:
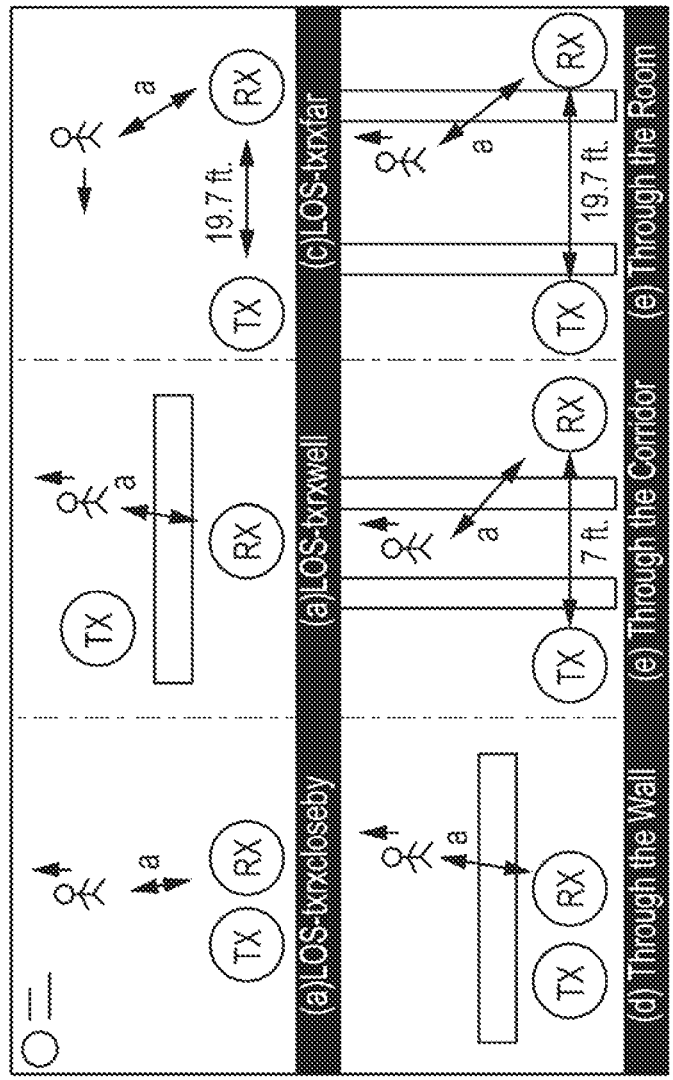
FIG. 9 is a schematic illustration of example transmitter and receiver placements in accordance with embodiments of the present invention.

Generally, transmitters of wireless signals (e.g. one or more of the wireless communications devices 105) and receivers (e.g. a receiver of the device 110) may be placed in a variety of arrangements in a system. Example positions of transmitters and receivers are provided herein with reference to FIG. 9. In some examples, the transmitter of wireless signals and the receiver for the device that is configured to recognize gestures may be co-located on a same device (e.g. the device 110 may also include a transmitter of wireless signals). In some examples, the transmitter and receiver may be on different devices which may be in a same location, or may be in different locations. In examples of co-located transmitters and receivers, directional antennas, full-duplex radios, or other modulation schemes may be used to reduce or eliminate self-interference.

By leveraging wireless communications signals in an environment, examples of devices and systems described herein may provide a whole-home gesture recognition system that may not require camera or other image-taking infrastructure. Because wireless communications signals may not require line-of-sight between devices for communication and can generally traverse through walls, gesture recognition is possible in examples of the present invention using only a few signal sources (e.g. 1, 2, 3, 4, 5, 6, or 7 signal sources, although more may also be used).

Figure 2:
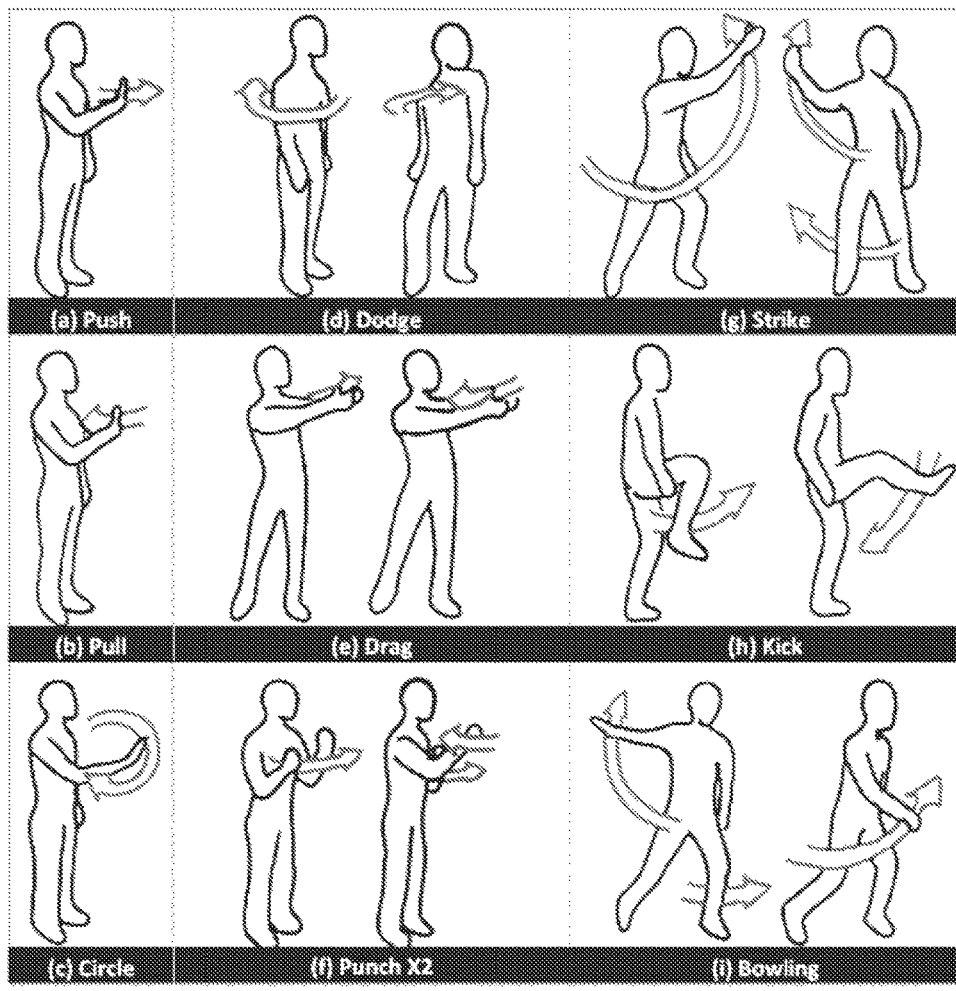
FIG. 2 is a schematic illustration of example gestures which may be identified in accordance with examples of the present invention.

Gestures which may be identified in accordance with examples of the present invention include 1-dimensional, 2-dimensional, and 3-dimensional gestures. FIG. 2 is a schematic illustration of example gestures which may be identified in accordance with examples of the present invention. As shown in FIG. 2, the gestures include, but are not limited to, push (FIG. 2A), pull (FIG. 2B), circle (FIG. 2C), dodge (FIG. 2D), drag (FIG. 2E), punch (FIG. 2F), strike (FIG. 2G), kick (FIG. 2H), bowling (FIG. 2I), or combinations thereof. Other gestures may also be used, including but not limited to, waving, nodding, pointing gestures made by a user where, for example, the user points at a device to control the device, and falling. Generally, gestures refer to movements that may be made by the arms, legs, or both of an entity. In other examples, gestures may include movements made by other parts of a body, such as a head, pelvis, tail, or wing. In other examples, gestures may include movements made by an object, such as a robot or other entity (e.g. robotic arm movement, appliance movement, or other robotic movement). Devices may detect gestures (e.g. detecting a fall of a person), may find a location of a person as they gesture, or perform other actions responsive to identification of a gesture.

Example devices according to the present invention may leverage features (e.g. Doppler shifts) of communications signals to recognize gestures. Generally, Doppler shift refers to a frequency change of a wave as its source moves relative to the observer. A canonical example is a change in the pitch of a train's whistle as it approaches and departs from a listener. In the context of wireless communication signals, considering multi-path reflections from an entity performing a gesture, a pattern of Doppler shifts may be received at a receiver that may be indicative of the gesture.

For example, a user moving her hand away from the receiver may result in a negative Doppler shift, while moving her hand towards the receiver results in a positive Doppler shift. These Doppler shifts generated due to gestures may generally be very small Doppler shifts and may be challenging to detect. For example, since wireless signals are electromagnetic waves that generally may propagate at the speed of light (e.g. c m/sec), an entity moving at a speed of v m/sec, may generate a maximum Doppler shift of $2f/c*v$, where f is the frequency of the wireless transmission. Thus, for example, a 0.5 m/sec gesture may result in a 17 Hz Doppler shift on a 5 GHz WiFi transmission. Typical wireless transmissions have orders of magnitude higher bandwidth (e.g. 20 MHz for WiFi). Thus, for gesture recognition, detection of Doppler shifts of a few Hertz from the 20 MHz WiFi signal may be desirable in some examples.

Examples of the present invention may transform the received wireless communications signal into a narrowband pulse with a bandwidth of a few Hertz. Examples of devices, methods, and systems described herein (which can be implemented on a WiFi AP) may then track the frequency of this narrowband pulse to detect Doppler shifts resulting from gestures. For example, the processing unit(s) 114 of FIG. 1 may be configured to (e.g. the device 110 may be programmed to, or circuitry may be provided to) transform received wireless communications signals into a narrowband pulse and track the frequency of the narrowband pulse to detect Doppler shifts resulting from gestures.

Figure 3:
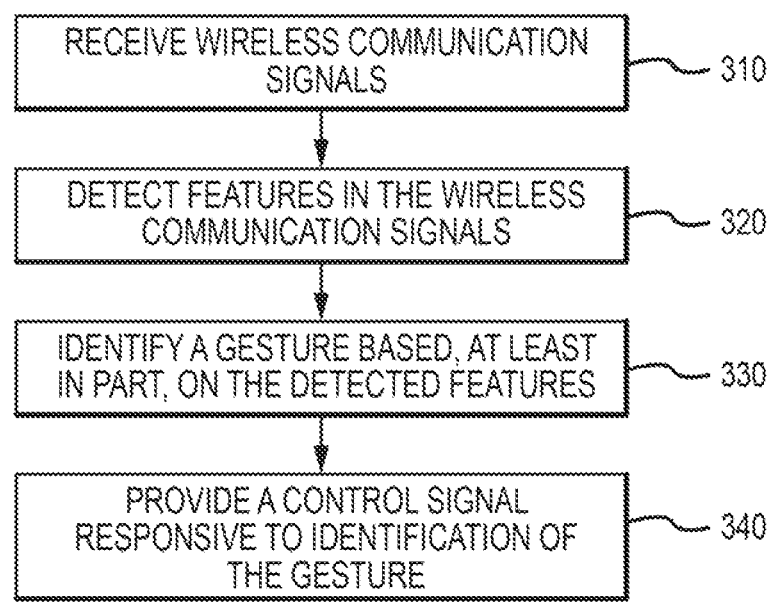
FIG. 3 is a flowchart of an example method described herein.

FIG. 3 is a flowchart of an example method described herein. The method includes operation 310, receive wireless communication signals. Examples of wireless communication signals have been described above, and may generally be received from any number of wireless communications devices in an environment. In operation 320, features in the wireless communication signals are detected. The features may include Doppler shifts, as described herein. In operation 330, a gesture is identified based, at least in part on the detected features in the wireless communication signals. In operation 340, a control signal may be provided responsive to the identified gesture. In some examples, components of the system shown in FIG. 1 may be used to implement the method of FIG. 3.

Figure 4:
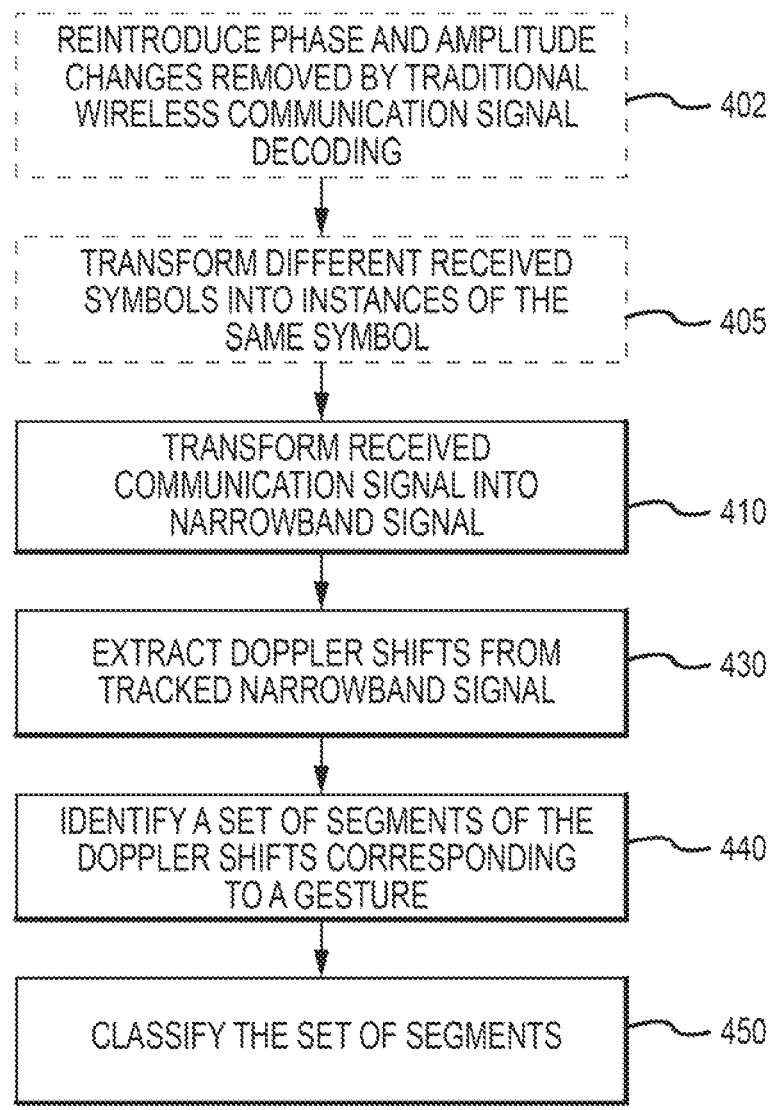
FIG. 4 is a flowchart of an example method described herein.

FIG. 4 is a flowchart of an example method described herein. The method of FIG. 4 may be used to implement the operations 320 and 330 of FIG. 3. The method of FIG. 4 is an example method of detecting features in a wireless communication signal and identifying a gesture based, at least in part, on the features. In optional operation 402, phase and amplitude information that may have been removed in a traditional decoding process may be reintroduced to received wireless communication signals. In optional operation 405, different received symbols may be transformed into same symbols. In operation 410, received wireless communication signals may be transformed into a narrowband signal. In operation 430, Doppler shifts may be extracted from the tracked narrowband signal. In operation 440, a set of segments of the Doppler shifts corresponding to a gesture may be identified. In operation 450, the set of segments may be classified as a particular gesture. Components of the system of FIG. 1 may be used to implement the method shown in FIG. 4. For example, the device 114, including the receiver 112 of FIG. 1 may be used to implement the method shown in FIG. 4.

A narrowband signal may be generated from received wireless communication signals to facilitate Doppler shift extraction in examples of the present invention. Doppler shift generally refers to change in the observed frequency as a transmitter and a receiver move relative to each other. In examples of the present invention, an entity reflecting the signals from the transmitter can be thought of as a virtual transmitter that generates the reflected signals. Now, as the entity (e.g. virtual transmitter) moves towards the receiver, the crests and troughs of the reflected signals arrive at the receiver at a faster rate. Similarly, as an entity moves away from the receiver, the crests and troughs arrive at a slower rate. More generally, a point object moving at a speed of v at an angle of µ from the receiver, results in a Doppler shift given by the following equation $$\Delta f \propto \frac{2v\cos(\theta)}{c} f$$

where c is the speed of light in the medium and f is the transmitter's center frequency. Note that the observed Doppler shift generally depends on the direction of motion with respect to the receiver. For instance, a point object moving orthogonal to the direction of the receiver results in no Doppler shift, while a point object moving towards the receiver maximizes the Doppler shift. At least in part because gestures typically involve multiple point objects moving along different directions, the set of Doppler shifts seen by a receiver can be used to classify different gestures.

Note that higher transmission frequencies generally result in a higher Doppler shift for the same motion. Thus, a wireless communication signals at 5 GHz results in twice the Doppler shift as a wireless communication signal at 2.5 GHz. In some examples, much higher frequencies (e.g., at 60 GHz) may not be suitable for whole-home gesture recognition since they may be more directional and typically are not suitable for non-line-of-sight scenarios.

Note that faster speeds may result in larger Doppler shifts, while slower speeds result in smaller Doppler shifts. Thus, it may be easier to detect an entity running towards the receiver than to detect an entity walking slowly. Further, gestures involving full-body motion (e.g. walking towards or away from the receiver) may be easier to capture than gestures involving only parts of the body (e.g., hand motion towards or away from the receiver). Generally, full-body motion involves many more point object moving at the same time. Thus, it may create Doppler signals with much larger energy than when the entity uses only parts of its body or system.

Gestures made by entities herein may generally result in a small Doppler shift that may be difficult to detect using transmission of typical wireless communication signals (e.g., WiFi, WiMax, LTE, etc.). For instance, consider a user moving her hand towards the receiver at 0.5 m/sec. From Eq. 1, this results in a Doppler shift of about 17 Hertz for a WiFi signal transmitted at 5 GHz (µ=0). Since the bandwidth of WiFi's transmissions is at least 20 MHz, the resulting Doppler shift is orders of magnitude smaller than WiFi's bandwidth. Identifying such small Doppler shifts from these transmissions can be challenging.

Examples described herein, however, provide systems, devices, and methods that may identify Doppler shifts at the resolution of a few Hertz from wireless communication signals. The received wireless communication signal may be transformed into a narrowband pulse (e.g. operation 410 of FIG. 4). The narrowband pulse may, for example, have a bandwidth of a few Hertz. A frequency of the narrowband pulse may be tracked and Doppler shifts extracted (e.g. operation 430 of FIG. 4).

Examples of transforming a wireless communication signal into a narrowband pulse include examples of transforming an OFDM signal into a narrowband pulse. OFDM generally divides the used RF bandwidth into multiple sub-channels and modulates data in each sub-channel. For instance, WiFi typically divides the 20 MHz channel into 64 sub-channels each with a bandwidth of 312.5 KHz. The time-domain OFDM symbol is generated at the transmitter by taking an FFT over a sequence of modulated bits transmitted in each OFDM subchannel. Specifically, the transmitter (e.g. transmitters of the wireless devices 105a-c of FIG. 1) takes blocks of N modulated bits (N=64 in 802.11), and applies an N-point Inverse Fast Fourier Transform (IFFT), $$x_k = \Sigma_{n=1}^{N} X_n e^{i2\pi k n / N}$$

where $X_n$ is the modulated bit sent in the nth OFDM sub-channel. Each block of x1, ... xN forms a time-domain OFDM symbol that the receiver decodes by performing the FFT operation, $$X_n = \Sigma_{k=1}^{N} x_k e^{-i2\pi k n / N}$$

To facilitate understanding how examples of systems and methods describe herein operate on these OFDM signals, two general examples are discussed. In a first example, a transmitter is considered which repeatedly sends the same OFDM symbol. In another example, the approach is generalized to arbitrary OFDM symbols, making the scheme applicable to 802.11 frames, for example.

Examples are discussed where a transmitter (e.g. a transmitter of the devices 105a-c in FIG. 1) sends the same OFDM symbol. In this case, instead of performing an FFT over each OFDM symbol, examples of devices and systems herein (e.g. the device 110 of FIG. 1) performs a large FFT over M consecutive OFDM symbols. As a consequence of this operation, the bandwidth of each OFDM sub-channel is reduced by a factor of M. Accordingly, examples of devices and systems described herein may perform a transform (e.g. a FFT) over a plurality of consecutive received symbols of a wireless communication signal.

To understand the bandwidth reduction achieved, consider the receiver (e.g. the device 110 of FIG. 1) performs a 2N point FFT over two consecutive, identical OFDM symbols.

The output of the FFT can be written as, $$X_n = \Sigma_{k=1}^{N} x_k e^{-i2\pi k n / 2N} + \Sigma_{k=N+1}^{2N} x_k e^{-i2\pi k n / 2N}$$

Since the first N transmitted samples are identical to the last N samples, $x_k = x_{k+N}$, for k=1 to N, we can re-write the above equation as $$X_n = \Sigma_{k=1}^{N} x_k e^{-i2\pi k n / 2N} + \Sigma_{k=1}^{N} x_k e^{-i2\pi (k+N) n / 2N}$$

After simplification, we get:

$$X_n = \sum_{k=1}^{N} x_k e^{-\frac{i2\pi k n}{2N}} (1 + e^{-i\pi n})$$

Now, when n is an even number, $(1+e^{-i\pi n})=2$, but when n is an odd number, $(1+e^{-i\pi n})=0$. Thus, the above equation can be re-written as, $$X_{2l} = 2\sum_{k=1}^{N} x_k e^{-\frac{i2\pi k l}{2N}}; X_{2l+1} = 0$$

Figure 5A:
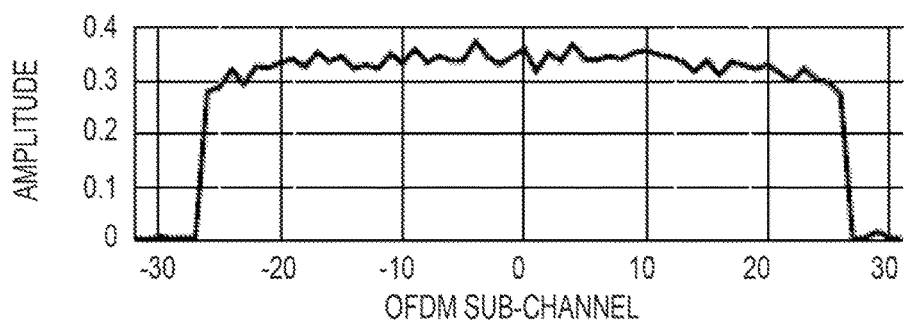
FIGS. 5A and 5B are plots of a Fast Fourier Transform (FFT) of an OFDM signal and two OFDM signals, respectively, in accordance with embodiments of the present invention.
Figure 5B:
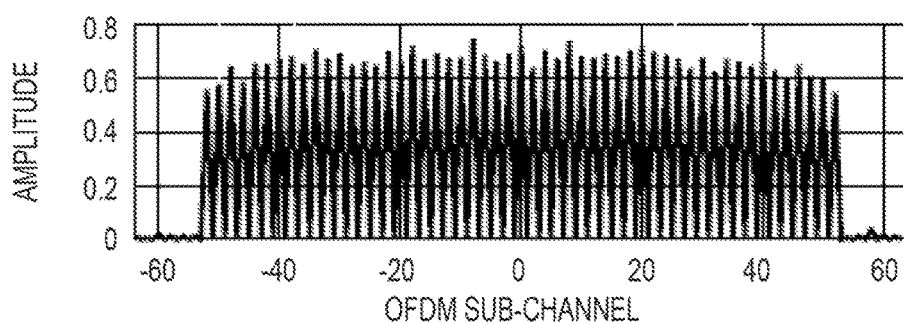

FIGS. 5A and 5B are plots of an FFT of an OFDM signal and two OFDM signals, respectively, in accordance with embodiments of the present invention. The plots show outputs of an FFT taken over an OFDM signal (FIG. 5A) and over two identical OFDM signals (FIG. 5B). As shown in FIG. 5B, when an FFT is performed of multiple (e.g.

consecutive) OFDM signals, the odd sub-channels are zero and the even sub-channels capture the output of an N-point FFT on a single OFDM symbol. This may be understood by recognizing that in each sub-channel, the same modulated information is transmitted in both the OFDM symbols. Thus, the bandwidth used by each sub-channel effectively halves.

More generally, when a receiver performs an MN-point FFT over an OFDM symbol that is repeated M times, the bandwidth of each sub-channel is reduced by a factor of M.

Accordingly, embodiments of methods, devices, and systems described herein may include creating one or more narrowband signals centered at certain sub-channels by performing an FFT operation over repeated OFDM symbols. For example, the device 110 of FIG. 1 may perform an FFT operation over multiple (e.g. consecutive) OFDM signals. For example, the receiver 112 may be configured to perform the FFT in that manner, and/or the processing unit(s) 114 may be operated in accordance with stored instructions to operate in that manner. In some examples, an FFT may be performed over a one-second duration to provide a one-Hertz wide narrowband signal. Accordingly, narrowband signals may be generated from received wireless communication signals. An FFT operation may be taken over multiple OFDM signals to implement the operation 410 of FIG. 4 in some examples.

In some examples, the speed of gestures of interest may be known and used to reduce the computational complexity of systems, devices, and methods described herein by computing the FFT at only frequency ranges of interest. For example, since the speeds at which a human can typically perform gestures are between 0.25 m/sec and 4 m/sec, the Doppler shift of interest at 5 GHz is between 8 Hz and 134 Hz. Thus, example receivers (e.g. device 110 of FIG. 1) described herein may compute the FFT output corresponding to only these frequencies.

In some examples, repetitive OFDM signals may not be transmitted by transmitters used in the example system. Different data may be transmitted in consecutive signals by transmitters in the example system. Nonetheless, examples described herein may extract Doppler shifts from such transmissions by generating a narrowband signal form the received wireless communication signals.

Generally, systems, devices, and methods described herein may include a data-equalizing reencoder at the receiver (e.g. the device 110 of FIG. 1) that may transform different received OFDM symbols into the same symbol. In some examples, the receiver first decodes the symbols using the standard decoder (e.g. 802.11 decoder). For example, the receiver may perform an FFT on each time domain OFDM symbol and transforms it into the frequency domain. The receiver, then, decodes the modulated bits in each sub-channel, passes the modulated bits through the demodulator and the convolutional/Viterbi decoder to get the transmitted bits. Now that the receiver knows the modulated bits, it transforms every received symbol into the first OFDM symbol.

Say $X_n^i$ denotes the modulated bit in the nth sub-channel of the ith OFDM symbol. Example devices and methods (e.g. the device 110 of FIG. 1) equalize the ith OFDM symbol with the first symbol. For example, the nth frequency sub-channel in the ith symbol may be multiplied with $$\frac{X_n^1}{X_n^i}.$$

In this manner, the received symbols may be data-equalized to a first (or other selected) symbol. An IFFT may be performed on each of these equalized symbols to get the corresponding time domain samples. Since these data-equalization operations only modify the data in each sub-channel, they do not generally change either the wireless channel or the Doppler shift information. Accordingly, the different OFDM symbols have effectively become same OFDM symbols and narrowband signals may be generated by transforming multiple symbols as described herein.

Note that gestures may change the phase and amplitude of the received symbols. A traditional decoder accounts for these changes by using the pilot bits that are present in every OFDM symbol. For example, the receiver may remove phase and amplitude changes that encode gesture information during the decode process. To avoid this, during the re-encoding phase before computing the IFFT, examples of devices, systems, and methods herein, may reintroduce the phase and amplitude changes that were removed by the decoder. This may aid in ensuring that gesture information is not lost in decoding. In some examples, reintroduction may not be necessary if, for example, the gesture identification process has access to the wireless communication signals as received prior to decoding.

In some examples, a frequency offset between the transmitter (e.g. a transmitter of one or more of the devices 105*a-c* of FIG. 1) and the receiver (e.g. the device 110 of FIG. 1) creates a shift in the center frequency, which can be confused for a Doppler shift. Accordingly, example devices, systems, and methods herein may obtain a coarse estimate of the frequency offset using a preamble at a beginning of the transmission. The estimated frequency offset may be used to compensate during a remainder of the transmission. Further, note the notion that in the absence of residual offsets, the energy in the DC frequency (center frequency of each OFDM sub-channel) corresponds to the paths from the transmitter to the receiver that do not involve the entity making a gesture. However, with residual offsets, both the DC and the Doppler frequencies are shifted by the same amount. The DC energy (the energy from the transmitter to the receiver minus the reflections from the entity making a gesture) is typically much higher than the Doppler energy (reflections due to the gesture). Accordingly, example devices, systems, and methods described herein may track the frequency corresponding to the maximum energy and correct for the residual frequency offset.

Moreover, examples of systems, devices, and methods described herein my account for a cyclic prefix that may be sent by transmitters of wireless communication devices. Some examples described herein treated symbols as being received back-to-back. However, many communication schemes, such as 802.11 transmitters, send a cyclic prefix (CP) between every two OFDM symbols to prevent intersymbol interference. The CP is generally created by taking the last k samples from each OFDM symbol. Example systems, devices, and methods described herein may account for the CP by replacing the received samples corresponding to the CP with the last k samples from the data equalized symbol. This generally transforms the received signal into a repetition of the same OFDM symbol.

Still further, examples of systems, devices, and methods described herein may compensate for intermittent wireless communication signals. For example, transmitters of wireless communication devices (e.g. the devices 105*a-c* of FIG. 1) may not transmit continuously. Accordingly, systems, devices, and methods for identifying gestures herein (e.g. the device 110 of FIG. 1) may interpolate (e.g. linearly interpolate) received symbols (e.g. OFDM symbols) to fill time slots where no transmission happens. The interpolation is may be performed per sub-channel after the symbols are transformed into the frequency domain. After interpolation, the receiver may transform all OFDM symbols, both original and interpolated, back to the time domain and form a synthesized time continuous trace.

Referring back to FIG. 4, Doppler shifts may be extracted in operation 430. To implement operation 430 in some examples, the frequency-time Doppler profile of the narrowband signal provided by operation 410 may be computed. To do this, a sequence of FFTs taken over time may be computed (e.g. by the device 110 of FIG. 1). For example, an FFT may be computed over samples in a first half-a-second interval. Such an FFT may provide a Doppler resolution of 2 Hertz. Another FFT may be computed (e.g. by the device 110 of FIG. 1) over a next overlapping half-a-second interval beginning at a threshold time (e.g. 5 ms) from a start of the last interval. This process may be repeated to obtain a frequency-time profile.

Figure 6:
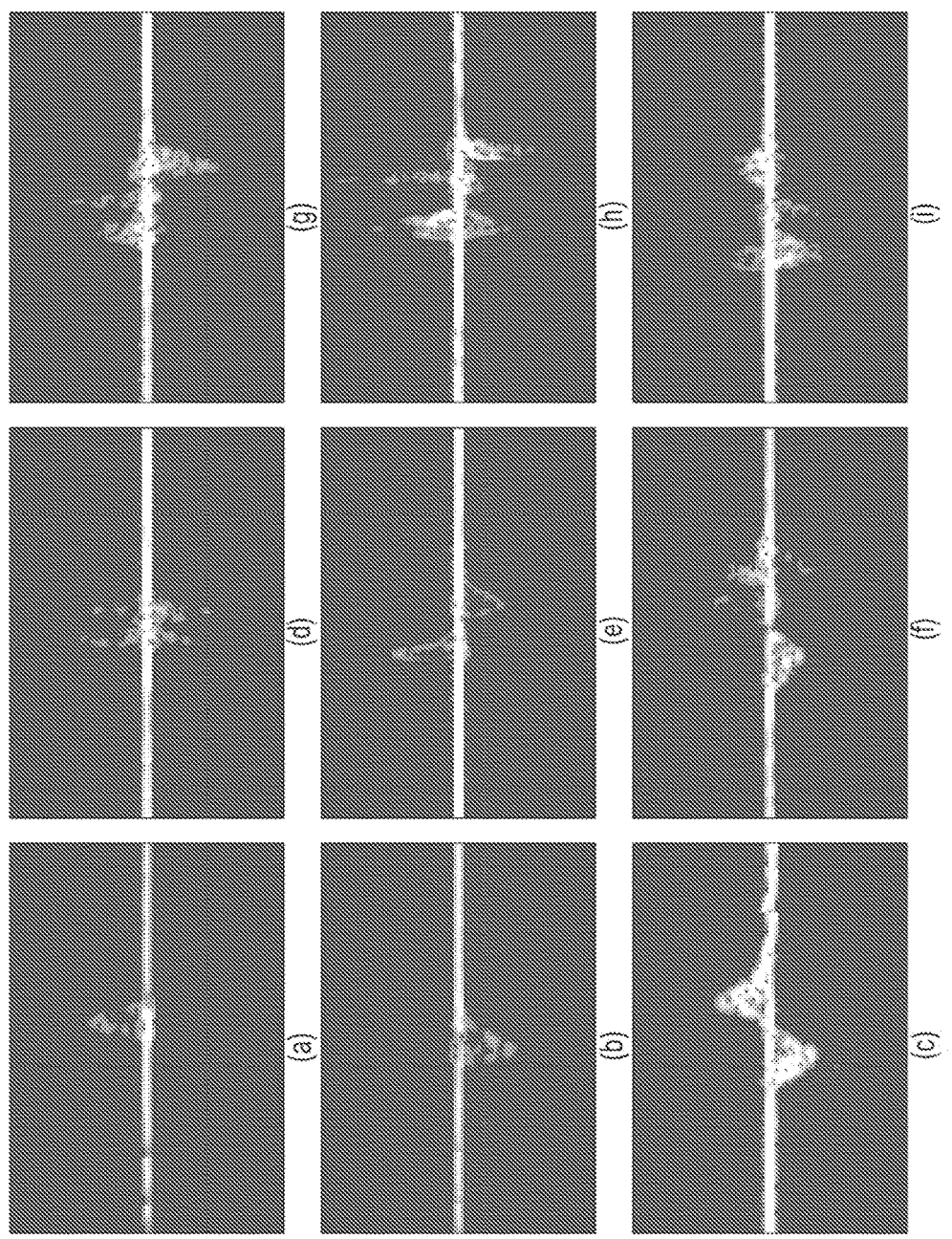
FIGS. 6a-i are example frequency-Doppler profiles of the gestures shown in FIG. 2.

FIGS. 6a-i are example frequency-Doppler profiles of the gestures shown in FIG. 2. The frequency-Doppler profiles may generally be segmented by methods, devices, and systems described herein (e.g. the device 110 of FIG. 1) into sequences of positive and negative Doppler shifts, which may uniquely identify each gesture. So, for example, the device 110 of FIG. 1 may analyze wireless communication signals to extract information about sequences of positive and negative Doppler shifts that may be used to identify (e.g. detect) a gesture. Referring to FIG. 6A, the frequency-Doppler profile of a user moving her hand towards the receiver is shown (e.g. "push gesture). The plot shows that, at the beginning of the gesture most of the energy is concentrated in the DC (zero) frequency. This corresponds to the signal energy between the transmitter and the receiver, on paths that do not include the human. However, as the user starts moving her hand towards the receiver, increasing positive Doppler frequencies are seen (corresponding to hand acceleration) and then decreasing positive Doppler frequencies (corresponding to hand deceleration).

Referring to FIGS. 6a-i, note that the frequency-Doppler profiles correspond to the gestures in FIG. 1. The plots of FIGS. 6a-i show that the profiles are a combination of positive and negative Doppler shifts. Further, each gesture is represented by a set of segments which have positive and negative Doppler shifts. For example, the profile in FIG. 6A has just one segment with positive Doppler shift. However, FIG. 6B has two segments each of which has a positive and a negative Doppler shift. Further, within each segment, the Doppler energy first increases and then decreases (which may correspond to acceleration and deceleration of human body parts in some examples).

Accordingly, examples of gestures may be represented by a series of segments of positive and negative Doppler shifts. Each segment generally has either a positive or negative Doppler shift and has a beginning at a region of increasing Doppler energy and an end a region of decreasing Doppler energy, or vice versa.

Referring again to FIG. 4, in operation 440, a set of segments of Doppler shifts may be identified corresponding to a gesture. Note that energy in each segment generally first increases and then decreases. Accordingly, to identify a set of segments that correspond to a gesture, example devices, systems, and methods described herein (e.g. the device 110 of FIG. 1) may compute the average energy in the positive and negative Doppler frequencies (other than the DC and the four frequency bins around it in some examples). If the ratio between this average energy and the noise level is greater than a threshold (e.g. 3 dB in some examples), the beginning of a segment may be detected (e.g. by the device 110 of FIG. 1). When this ratio falls below the threshold (e.g. 3 dB in some examples), the end of the segment may be detected (e.g. by the device 110 if FIG. 1). Multiple segments may be identified as corresponding to a gesture. Generally segments within a particular time range of one another will be considered to correspond to a same gesture. In one example, any two segments separated by less than one second are considered part of a single gesture.

In operation 450 of FIG. 4, the set of segments may be classified as a particular gesture. Classification may occur by correlating (e.g. matching) a pattern of segments (e.g. a pattern of positive and negative Doppler shifts) with a known pattern of segments for a particular gesture. The known pattern of segments may be referred to as a gesture signature, and gesture signatures may be stored and made accessible to devices and systems (or integral with devices and systems) described herein. The correlation may be performed, for example, using machine learning, pattern matching, or combinations thereof.

In some examples, there are three types of segments: segments with only positive Doppler shifts, segments with only negative Doppler shifts, and segments with both positive and negative Doppler shifts. These can be represented as three numbers, e.g. '1', '−1', and '2'. Each gesture in FIGS. 6a-i can accordingly be stored as a unique sequence of these three numbers. Now, classification in operation 450 can be performed by comparing and matching the received number sequence with the set of predetermined sequences (e.g. gesture signatures). Note that this classification methodology may be operable with entities performing gestures at different speeds. Different speeds change the duration of each segment and the specific Doppler frequencies that have energy, but generally do not change the pattern of positive and negative shifts. Thus, the gestures performed at different speeds results in the same pattern of numbers and hence can be classified in accordance with methodologies described herein.

In other examples, segments may be defined and gestures classified using more types of segments than those described herein, or using other segments (e.g. segments defined in other manners than increasing and decreasing energy).

Examples of systems, methods, and devices are described herein which may identify gestures made by a particular entity in an environment, and may be able to distinguish gestures of the particular entity from gestures made by other entities in the environment. For example, a typical home may have multiple people who can affect the wireless communication signals at the same time. Examples described herein may utilize Multiple-Input Multiple-Output (MIMO) capability that may be provided by the wireless communications signals themselves (e.g. provided by a communication standard such as 802.111 or others), to identify gestures from a particular entity. MIMO may provide throughput gains by enabling multiple transmitters to concurrently send packets to a MIMO receiver. Without being bound by theory, if we consider the wireless reflections from each entity as signals from a wireless transmitter, then they may be separated using a MIMO receiver. Rather than sending a known signal from a transmitter, an entity may perform a known gesture, which may be a repetitive gesture that may be treated as a preamble. The signature resulting from the known gesture may be utilized by receivers described herein to estimate a MIMO channel that maximizes energy reflections from an entity performing the known gesture. Once the receiver identifies this channel, the receiver may be able to track the entity to identify subsequent gestures made by the entity, distinguished from gestures made by other entities.

Examples described herein may utilize a repetitive gesture as an entity's preamble. Devices, e.g. the device 110 of FIG. 1, may utilize the preamble to estimate the MIMO channel that maximizes (or meets another criteria) the energy of the reflections from the entity. Once the device (e.g. receiver) locks on to this channel, the entity performs normal (non-repetitive) gestures that the receiver classifies using the Doppler shifts. In some examples, the preamble may be extracted without requiring the entity to perform gestures at a pre-determined speed.

Figure 7:
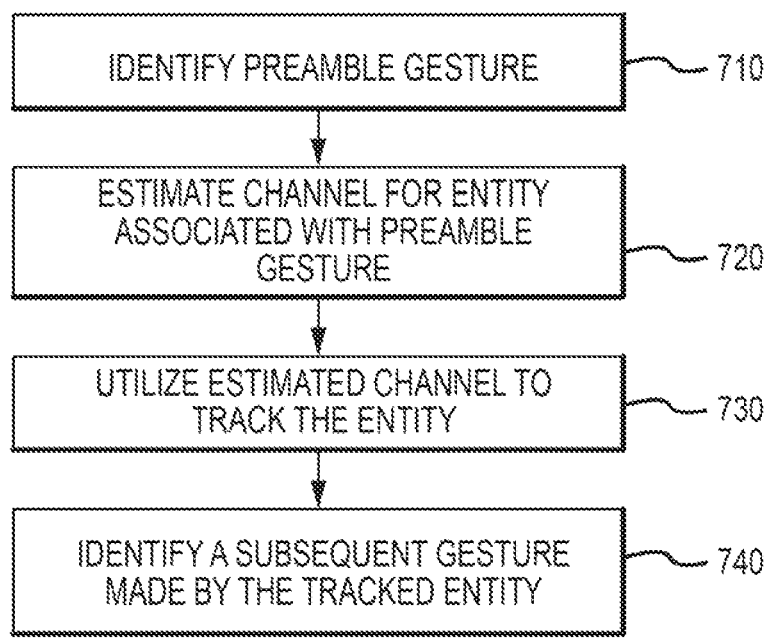
FIG. 7 is a flowchart of an example method in accordance with embodiments of the present invention.

FIG. 7 is a flowchart of an example method in accordance with embodiments of the present invention. In operation 710, a preamble gesture may be identified (e.g. by the device 110 of FIG. 1). For example, a preamble gesture may be a repetitive "push." An entity pushes her hand towards and away from the receiver, and repeats this gesture to form the preamble. This creates a sequence of alternating positive (+1) and negative (−1) Doppler shifts, e.g., an alternating sequence of +1 and −1 symbols. This sequence may be used (e.g. by the device 110 of FIG. 1) to correlate and detect the presence of a target entity. For example, as described above with respect to FIG. 4, the series of Doppler shift segments may be identified and classified as a preamble gesture. This correlation may work even in the presence of interfering users, since their motion is generally uncorrelated with the preamble's alternating sequence of positive and negative Doppler shifts.

In operation 720, a channel may be estimated for the entity that is associated with the preamble gesture. The MIMO channel that maximizes the Doppler energy from the target entity may be calculated (e.g. by the device 110 of FIG. 1). Each segment of the gesture may be analyzed to find the MIMO direction that maximizes the Doppler energy in some examples. The MIMO direction may then be averaged across segments to improve the estimation accuracy. An iterative methodology recently used in TIMO may be used to maximize the Doppler energy from the target entity in each segment. Examples of the iterative methodology are described in S. Gollakota, et. al., "Cleaning the RF Smog: Making 802.11 robust to cross-technology interference," SIGCOMM, 2011, which is hereby incorporated by reference in its entirety for any purpose. The methodology generally includes applying an iterative gradient-descent style algorithm that iterates over the amplitude and phase on each antenna to find a channel combination that maximizes the SNR of the WiFi signal. In examples of the present invention, weights on each antenna may be adapted (e.g. by the device 110 of FIG. 1) to increase the Doppler energy of the target entity. In some examples, this methodology may be implemented pair-wise on each antenna (of, e.g. the device 110 of FIG. 1) with respect to the first antenna. For example, the weights (amplitude and phase) for each antenna may be computed with respect to the first antenna. In some examples, estimation accuracy is improved by averaging across gestures. In some examples, the iterative methodology may be evaluated on every gesture performed by the target entity, to improve estimation accuracy. The MIMO direction may be updated as different entities interfere with the target entity, and as the target entity moves. Generally, as the interfering users change, the optimal MIMO direction that maximizes the Doppler energy also changes. By applying the iterative algorithm on every gesture, examples described herein can track these changes.

Referring again to FIG. 7, in operation 730, the estimated (e.g. calculated) channel is used to track the target entity. For example, if the target entity has not moved, a subsequent gesture may be identified (in operation 740) as coming from the target entity if it shares a same estimated channel as calculated in operation 720. In some examples, a target entity may perform the preamble gesture again when moving to a new location. However, in other examples, the estimated channel associated with the target entity may be updated as the entity moves by, for example, detecting movement of the entity. For example, motion (e.g., walking and running) may create Doppler shifts which have a higher energy than gestures. Thus, the MIMO channel may be tracked as the target entity moves, reducing the need to perform the repetitive gesture again.

A subsequent gesture may be identified (in operation 740) as coming from the target entity if it has the estimated channel corresponding to the target entity's estimated channel at the time of the gesture. In some examples, known gestures may be used to provide security. For example, a secret pattern of gestures may be used as a secret key to get access to the system. Once the access is granted, the receiver can track the authorized user and perform the required gestures. For example, on identification of the secret pattern of gestures, the device 110 of FIG. 1 may provide a control signal to unlock functionality of the system.

Accordingly, entities may be identified in examples described herein through use of a preamble gesture. In this manner, gestures made by other entities may be discriminated from that of a target entity.

Example systems, devices, and methods described herein may address multi-path effects. In practice, reflections, like typical wireless signals, may arrive at the receiver along multiple paths. Extracting general Doppler profiles in the presence of multi path may be challenging. However, the use of only the positive and negative Doppler shifts for gesture classification may advantageously simplify the problem. By employing an iterative methodology, examples of which are described above, to adapt the amplitude and phase to maximize either positive or negative Doppler energy, a MIMO direction may be identified that can focus on multipaths which result in similar Doppler shifts. Note that computing Doppler shifts does not in some examples require distinguishing between the multi-paths in the system. Instead a system need only in some examples distinguish between sets of paths that all create either a positive or a negative Doppler shift. Thus, gesture recognition may be performed generally using a lower number of antennas than is required to distinguish between multi-paths.

Moreover, since a repetitive preamble gesture in the preamble always starts in a particular way, e.g. with the user moving her hand towards the receiver, the receiver can calibrate the sign of the subsequent Doppler shifts. Specifically, if it sees a negative Doppler shift when it expects a positive shift, the receiver may flip the sign of the Doppler shift. This allows examples of devices, systems, and methods described herein to perform gesture recognition independent of the user location.

Example

An example system was implemented in GNURadio using USRP-N210 hardware. Gestures were correlated (e.g. classified) from the Doppler shifts using pattern matching methodology. The system was evaluated with five users in both an office environment and a two-bedroom apartment. Gestures were performed in a number of scenarios including line-of-sight, non-line-of-sight, and through-the-wall scenarios where the entity was in a different room from the wireless transmitter and the receiver. The entities performed a total of 900 gestures across the locations. The example system was able to classify nine whole-body gestures with an average accuracy of 94%. Using a 4-antenna receiver and a single-antenna transmitter placed in the living room, the example system can achieve the above classification accuracy in 60% of the home locations. Adding an additional singe-antenna transmitter to the living room achieves the above accuracy in locations across all the rooms (with the doors closed). Thus, with an WiFi AP acting as a receiver and a couple of mobile devices acting as transmitters, the example system can enable whole-home gesture recognition.

Over a 24-hour period, the example system's average false positive rate—events that detect a gesture in the absence of the target entity—is 2.63 events per hour when using a preamble with two gesture repetitions. This goes down to 0.07 events per hour, when the number of repetitions is increased to four. Using a 5-antenna receiver and a single-antenna transmitter, the example system can successfully perform gesture classification, in the presence of three other users performing random gestures. However, the classification accuracy reduces as we further increase the number of interfering users. Generally, given a fixed number of transmitters and receiver antennas, the accuracy of example systems described herein may reduce with the number of users. However, since typical home scenarios do not have a large number of users in a single room, example systems may nonetheless enable a large set of interaction applications for always-available computing in home environments.

We implemented a prototype on the software radio platform and evaluate it on the USRP-N210 hardware. Each USRP is equipped with a XCVR2450 daughterboard, and communicates on a 10 MHz channel at 5 GHz. Since USRPN210 boards cannot support multiple daughterboards, we built a MIMO receiver by combining multiple USRP-N210s using an external clock. In our evaluation, we use MIMO receivers that have up to five antennas. We use single antenna USRP-N210s as transmitters. The transmitter and the receiver are not connected to the same clock. We build on the GNURADIO OFDM code base to transmit OFDM symbols over a 10 MHz wide channel. The transmitter uses different 802.11 modulations (BPSK, 4QAM, 16QAM, and 64QAM) and coding rates. The transmit power we use in our implementation is 10 mW which is lower than the maximum power allowed by USRP-N210s (and WiFi devices). This is because USRP-N210s exhibit significant non-linearities at higher transmit powers, which limit the ability to decode OFDM signals. We note, however, that, with higher transmission powers, one can in principle perform gesture recognition at larger distances.

Figure 8:
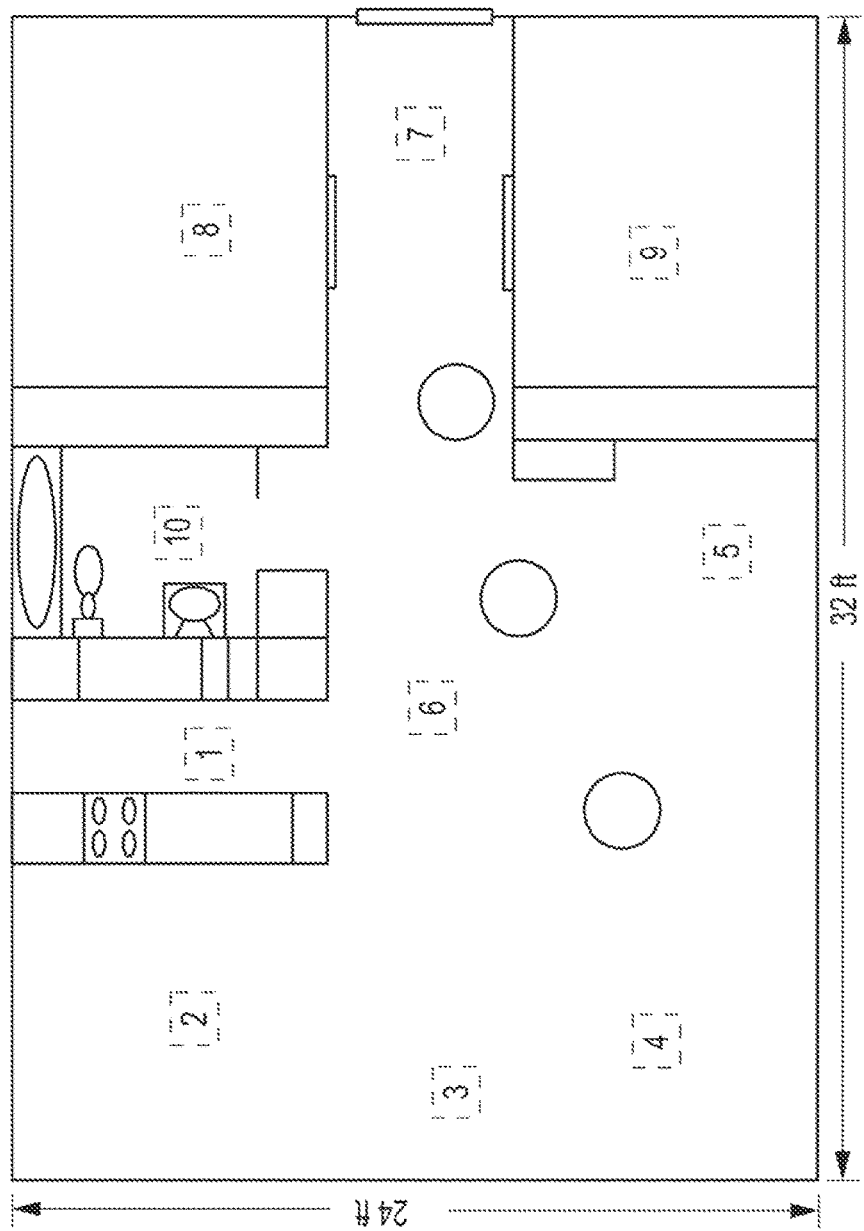
FIG. 8 is a layout of an environment in which an example system in accordance with the present invention is deployed.

We evaluate our prototype design in two environments:
  An office building. The building has an external structure that is primarily metal and concrete. We run the experiments in offices that are separated by double sheet-rock (plus insulation) walls with a thickness of approximately 5.7 inches.
  A two-bedroom apartment. The layout of the apartment is shown in FIG. 8. It includes a living room connected to the kitchen and dining area, and two bedrooms and a bathroom. The walls are hollow and have a thickness of 5.5 inches; the doors are made of wood and have a thickness of 1.4 inches. We run our experiments with a total of five users. In addition to evaluating the example system's ability to achieve whole-home gesture recognition, we evaluate it in six different scenarios, shown in FIG. 9.
  (a) LOS-txrxcloseby: Here a receiver and a transmitter are placed next to each other in a room. The user performs gestures in line-of-sight to the receiver.
  (b) LOS-txrxwall: Here a receiver and a transmitter are placed in adjacent rooms separated by a wall. The user performs the gestures in the room with the transmitter.
  (c) LOS-txrxfar: Here a receiver and a transmitter are placed 19.7 feet away from each other. The user performs gestures in line-of-sight to the receiver.
  (d) Through-the-Wall: Here a receiver and a transmitter are placed next to each other close to a wall. The user performs gestures in the room adjacent to the wall.
  (e) Through-the-Corridor: Here a receiver and a transmitter are placed in different rooms separated by a corridor. The user performs the gestures in the corridor.
  (f) Through-the-Room: Here a receiver and a transmitter are placed in different rooms separated by a room. The user performs the gestures in the middle room.

In scenarios (b), (c), (e), and (f) both the transmitter and the receiver use omnidirectional antennas. However, in scenarios (a) and (d) where the transmitter and the receiver are placed next to each other, to prevent the transmitter's signal from overwhelming the receiver's hardware, the transmitter uses a Ettus LP0965 directional antenna that is placed in a direction orthogonal to the receive antennas. The receiver, however, still uses omnidirectional antennas. In principle, we can further reduce the transmitter's interference in these two scenarios by leveraging techniques like full-duplex and interference nulling.

We compute the Doppler SNR from the frequency-time Doppler profile. Doppler SNR is the ratio between the average energy in the non-DC frequencies in the profile, with and without the gesture. We ask the user to move her hand towards the receiver, (e.g. the first gesture in FIG. 2). The user performs the gesture in the general direction of the receiver independent of its location. We compute the average Doppler SNR at each location by having each user repeat the gesture ten times.

Results versus distance: In scenarios (a), (b), (d), and (e), as the distance between the user and the receiver increases, the average Doppler SNR reduces. This is expected because the strength of the signal reflections from the human body reduces with distance. However, the received Doppler SNR is still about 3 dB at 12 feet, which is sufficient to identify gestures.

In scenarios (c) and (f), however, the Doppler SNR does not significantly reduce with the distance from the receiver. This is because in both these scenarios, as the user moves away from the receiver, she gets closer to the transmitter. Thus, while the human reflections get weaker as the user moves away from the receiver; since the user moves closer to the transmitter, the transmitted signals arrive at the user with a higher power, thus, increasing the energy in the reflected signals. As a result, the Doppler SNR is as high as 15 dB at distances of about 25 feet.

Results versus number of antennas: Across all the scenarios, using more antennas at the receiver increases the Doppler SNR. This is expected because additional antennas provide diversity gains that may be particularly helpful in the low SNR regime. Further the gains in the Doppler SNR are higher at large distances, and through-the-* scenarios. The gains are as high as 10 dB in some locations. Also note that in scenarios (d) and (f), the Doppler SNR at a single antenna receiver is as low as 1 dB across many positions;

such low SNRs may not be sufficient to classify gestures. Additional antennas significantly increase the Doppler SNR, enabling gesture detection in these scenarios.

With more antennas at the receiver, the iterative methodologies used can reduce the multi-path interference and hence can significantly improve the Doppler SNR. We note that across all the scenarios, using 3-4 antennas at the receiver is sufficient to achieve most of the MIMO benefits.

Summary: Using 3-4 antennas at the system receiver (e.g. the device 110 of FIG. 1) is likely sufficient to achieve gesture detection in the above scenarios. Gesture detection is feasible as long as the user is in the "range" of the receiver. This range can, however, be increased by spatially separating the transmitter and the receiver. Another option is to leverage multiple transmitters (e.g., mobile phone in the living room, and laptop in the kitchen) to increase this range.

We evaluate a whole-home scenario. We run experiments in the two-bedroom apartment shown in FIG. 8. We use a 4-antenna receiver (e.g. device 110 of FIG. 1) to compute the frequency-time Doppler profile using the methodology described herein. We then map the profile to the gestures. We use two single-antenna transmitters, as shown in FIG. 8, to maximize the range of our system. The transmitter and receiver use omni-directional antennas in our experiments. Since it is difficult to quickly implement carrier sense on software radios, the two transmitters time-share the medium every 10 ms.

The receiver and the two transmitters are all placed in the living room, with all the doors closed. We pick ten locations (marked in the layout) spanning all the rooms in the apartment. These locations include line-of-sight, non-line-of-sight, and through-the-wall settings. In each location, the users perform the nine gestures shown in FIG. 2 in the direction of the receiver, at a speed that was not predetermined.

Each gesture is performed a total of 100 times across all the locations.

The average accuracy is 94% with a standard deviation of 4.6% when classifying between our nine gestures. This is in comparison to a random guess, which has an accuracy of 11.1% for nine gestures. This shows that one can extract rich information about gestures from wireless signals. Only 2% of all the gestures (18 out of 900) were not detected at the receiver. Further investigation revealed that these mis-detections occurred when the user was in the kitchen and one of the bedrooms. In these locations, the reflected signals are weak and hence the Doppler SNR for these specific gestures was close to 0 dB.

We note that when only tx1 was used to perform gesture recognition, the accuracy was greater than 90% only in six of the ten considered locations. This shows that each transmitter provides a limited range for gesture recognition. Adding more transmitters increases this effective range. We, however, note that the two-bedroom apartment scenario only required two transmitters placed in the living room to successfully classify gestures across all the locations.

We also evaluate the system in the presence of other humans. We first measure the false detection rate in the absence of the target human. Then, we compute the accuracy of gesture recognition for the target human, in the presence of other humans. Finally, we stress test the system to see where it fails.

False detection rate in the presence of other humans: As described herein, the system detects the target human by using a repetitive gesture as a preamble. The repetitive gesture provides a protection against confusing other humans for the target user. We compute the average number of false detection events, i.e., when the receiver detects the target user (repetitive gesture), in her absence. To do this, we place our receiver and transmitter in the middle of an office room (with dimensions 32 feet by 30 feet) occupied by 12 people, over a 24-hour period. The occupants move about and have meetings and lunches in the office as usual. The receiver looks for a repetitive gesture where the user moves her hand towards and away from the receiver; thus, each repetition results in a positive Doppler shift followed by a negative Doppler shift.

When the receiver used a preamble with only one repetition (e.g., perform the gesture once), the number of false events is, on the average, 15.62 per hour. While this is low, it is expected because typical human gestures do not frequently result in a positive Doppler shift followed by a negative Doppler shift. Also, as the number of repetitions in the preamble increases, the false detection rate significantly reduces. Specifically, with three repetitions, the average false detection rate reduces to 0.13 events per hour; with more than four repetitions, the false detection rate is zero. This is expected because it is unlikely that typical human motion would produce a repetitive pattern of positive and negative Doppler shifts. Further, since the receiver requires repetitive positive and negative Doppler shifts to occur at a particular range of speeds (0.25 m/s to 4 m/s), it is unlikely that even typical environmental and mechanical variations would produce them.

The system computes the MIMO channel for the target user that minimizes the interference from the other humans. We would like to evaluate the use of MIMO in classifying a target user's gestures, in the presence of other moving humans. We run experiments in a 13 feet by 19 feet room with our receiver and transmitter. We have the target user perform the two gestures in FIGS. 2A and 2B. Our experiments have up to four interfering users in random locations in the room. The users were asked to perform arbitrary gestures using their arms. Using a five antenna receiver, the accuracy is as high as 90% with three interfering users in the room. Further, using additional antennas significantly improves this accuracy in the presence of multiple interfering users. We note however, that for a fixed number of transmitters and antennas at the receiver, the classification accuracy degrades with the number of users (e.g., a conference room setting or a party scenario). For example, in our experiments, the accuracy is less than 60% with four interfering users. However, since typical home scenarios do not have a large number of users in a room, the system can enable a significant set of interaction applications for always available computing embedded in the environment.

Since the system leverages MIMO to cancel the signal from the interfering human, it suffers from the near-far problem that is typical to interference cancellation systems. Specifically, reflections from an interfering user closer to the receiver, can have a much higher power than that of the target user. To evaluate the system's classification accuracy in this scenario, we fix the location of the target user six feet away from the receiver. We then change the interfering user's location between three feet and ten feet from the receiver. The target user performs the two gestures shown in FIGS. 2A and 2B. In each experiment, the interfering user adversarially performs the opposite gesture to the one performed by the target user. The receiver computes the MIMO channel for the target user by leveraging her preamble.

The smaller the distance between the interfering user and the receiver, the lower the Doppler SNR. Specifically, the Doppler SNR is as low as −10 dB when the interfering user is about 3.4 feet from the receiver. However, adding antennas at the receiver significantly improves the Doppler SNR. Specifically, with four-antennas, the Doppler SNR increases from −10 dB to 4.7 dB; which is sufficient to classify gestures. Thus, we conclude that adding additional antennas at the receiver can help mitigate the nearfar problem.

From the foregoing it will be appreciated that, although specific embodiments of the invention have been described herein for purposes of illustration, various modifications may be made without deviating from the spirit and scope of the invention.

What is claimed is:

1. A device comprising:
    a receiver configured to receive wireless communication signals, each wireless communication signal received from a plurality of sub-channels;
    at least one processing unit configured to identify features in the wireless communication signals, wherein identifying the features in the wireless communication signals comprises:
        equalizing received symbols in each sub-channel of the plurality of sub-channels, wherein equalizing the received symbols comprises multiplying each received symbol in a respective sub-channel with a ratio including a first received symbol of the respective sub-channel to provide equalized symbols;
        transforming the equalized symbols with a Fast Fourier Transform (FFT) to provide a narrowband signal; and
        analyzing a Doppler profile of the narrowband signal based on the equalized symbols to identify the features in the wireless communication signals;
    a memory accessible to the at least one processing unit and storing information regarding features in wireless communication signals caused by gestures; and
    wherein the at least one processing unit is further configured to identify a gesture based on the identified features in the wireless communication signals.

2. The device of claim 1, wherein the gestures include two-dimensional and three-dimensional gestures.

3. The device of claim 1, wherein the wireless communication signals include Orthogonal Frequency-Division Multiplexing (OFDM) signals, wherein the received symbols correspond to OFDM symbols.

4. The device of claim 1, wherein the wireless communication signals includes received signal strength indicators (RSSI), phase information, or combinations thereof.

5. The device of claim 1, wherein the wireless communication signals are transmitted from a cellular telephone, computer, or wireless router.

6. The device of claim 1, wherein identifying features in the wireless communication signals further comprises extracting a plurality of Doppler shifts in the Doppler profile.

7. The device of claim 6, wherein identifying features in the wireless communication signals further comprises:
    identifying a set of segments in the plurality of Doppler shifts; and
    classifying the set of segments as either positive Doppler shifts, negative Doppler shifts, or positive/negative Doppler shifts.

8. The device of claim 7, wherein classifying the set of segments as either positive Doppler shifts, negative Doppler shifts, or positive/negative Doppler shifts comprises:
    correlating the set of segments with a gesture signature, the gesture signature indicative of a known set of segments.

9. The device of claim 1 wherein the wireless communication signals comprise beacon signals.

10. The device of claim 1 wherein the at least one processing unit is configured to identify a preamble gesture from the features in the communication signals, and wherein the at least one processing unit is further configured to identify when a subsequent gesture is made by a same entity performing the preamble gesture.

11. The device of claim 1, further comprising a transmitter configured to transmit a control signal responsive to identification of the gesture.

12. The device of claim 1, wherein equalizing the received symbols in each sub-channel of the plurality of sub-channels according to the first received symbol of each respective sub-channel comprises modifying each received symbol using the respective first received symbol of each respective sub-channel.

13. A method comprising:
    receiving wireless communication signals from devices in an environment, each wireless communication signal received from a plurality of sub-channels;
    detecting features in the wireless communication signals, wherein detecting the features in the wireless communication signals comprises:
        equalizing received symbols in each sub-channel of the plurality of sub-channels, wherein equalizing the received symbols comprises multiplying each received symbol in a respective sub-channel with a ratio including a first received symbol of the respective sub-channel to provide equalized symbols;
        transforming the equalized symbols with a Fast Fourier Transform (FFT) to provide a narrowband signal; and
        analyzing a Doppler profile of the narrowband signal based on the equalized symbols to identify the features in the wireless communication signals;
    identifying a gesture based, at least in part, on the features in the wireless communication signals; and
    providing a control signal responsive to identification of the gesture.

14. The method of claim 13, wherein the wireless communication signals are Orthogonal Frequency Division Multiplexing (OFDM) signals.

15. The method of claim 13, wherein said detecting features in the wireless communication signals further comprises identifying at least one Doppler shift in the Doppler profile of the narrowband signal.

16. The method of claim 15, wherein identifying a gesture based, at least in part, on the features in the wireless communication signals comprises comparing the features to a plurality of stored gesture signatures.

17. The method of claim 13, wherein said identifying a gesture comprises correlating the features with a database of stored features related to gestures.

18. The method of claim 17, wherein said correlating comprises using machine learning, pattern matching, or combinations thereof.

19. The method of claim 13, wherein the wireless communication signals are provided by a cellular telephone, computer, router, or combinations thereof.

20. A method, comprising:
    receiving wireless communication signals from devices in an environment;
    detecting features in the wireless communication signals;
    identifying a gesture based, at least in part, on the features in the wireless communication signals, wherein the gesture comprises performance of a preamble gesture, wherein identifying the gesture based, at least in part, on the features in the wireless communication signals comprises:
equalizing received symbols in each sub-channel of the plurality of sub-channels to provide equalized symbols, wherein equalizing the received symbols comprises first received symbol of the respective sub-channel to provide equalized symbols;
transforming the equalized symbols with a Fast Fourier Transform (FFT) to provide a narrowband signal; and
comparing a Doppler profile of the narrowband signal with the plurality of gesture signatures to identify the gesture;
determining that a Multiple-Input Multiple-Output (MIMO) channel of a plurality of MIMO channels maximizes Doppler energy from an entity associated with the preamble gesture;
tracking the entity associated with the preamble gesture with the MIMO channel;
identifying a subsequent gesture based, at least in part, on the features in additional wireless communication signals from the tracked entity associated with the preamble gesture; and
providing a control signal responsive to identification of the subsequent gesture.

21. The method of claim 20, further comprising detecting further features in the wireless communication signals and determining whether the further features occurred due to an activity of the entity.

22. A system comprising:
a wireless communications device configured to provide periodic beacon signals using an Orthogonal Frequency Division Multiplexing (OFDM) protocol, each periodic beacon signal received from a plurality of sub-channels;
a router configured to receive the periodic beacon signals from the wireless communications device, wherein the router is in communication with a memory storing a plurality of gesture signatures, and wherein the router is configured to detect a gesture based on a comparison of features in the periodic beacon signals from the wireless communications device and the gesture signatures, wherein detecting the gesture comprises:
equalizing received symbols in each sub-channel of the plurality of sub-channels to provide equalized symbols, wherein equalizing the received symbols comprises multiplying each received symbol in a respective sub-channel with a ratio including a first received symbol of the respective sub-channel to provide equalized symbols;
transforming the equalized symbols with a Fast Fourier Transform (FFT) to provide a narrowband signal; and
comparing a Doppler profile of the narrowband signal with the plurality of gesture signatures to identify the gesture,
wherein the router further includes a transmitter configured to transmit a control signal responsive to the gesture; and
a controller coupled to a power outlet and including a receiver configured to receive the control signal, wherein the controller is configured to turn power on, off, or combinations thereof, responsive to the control signal.

23. The system of claim 22, further including a plurality of wireless communications devices, and wherein the router is further configured to receive the periodic beacon signals from the plurality of wireless communications devices.

24. The system of claim 22, wherein the router is further configured to identify a preamble gesture and track a user having made the preamble gesture.

25. The system of claim 24, wherein the router is further configured to differentiate between gestures made by the user and other entities.

* * * * *